United States Patent [19]
Petrich et al.

[11] Patent Number: 6,104,379
[45] Date of Patent: Aug. 15, 2000

[54] FOREARM-SUPPORTED EXOSKELETON HAND-TRACKING DEVICE

[75] Inventors: Kyle L. Petrich, Mt. View; Jaime S. Vargas, Palo Alto; Joe Wagner, Redwood City; Mark Yim, Palo Alto; James F. Kramer, Redwood City, all of Calif.

[73] Assignee: Virtual Technologies, Inc., Palo Alto, Calif.

[21] Appl. No.: 08/988,602

[22] Filed: Dec. 10, 1997

Related U.S. Application Data

[60] Provisional application No. 60/032,600, Dec. 11, 1996.

[51] Int. Cl.$^7$ ...................................................... G09G 5/08
[52] U.S. Cl. ............................ 345/157; 345/158; 345/156
[58] Field of Search .................................... 345/157, 158, 345/156, 159; 340/709

[56] References Cited

U.S. PATENT DOCUMENTS

| | | | |
|---|---|---|---|
| 4,414,984 | 11/1983 | Zarudiansky | 128/774 |
| 4,542,291 | 9/1985 | Zimmerman | 250/231 |
| 4,986,280 | 1/1991 | Marcus et al. | 128/774 |
| 5,086,785 | 2/1992 | Gentile et al. | 128/782 |
| 5,184,319 | 2/1993 | Kramer | 364/806 |
| 5,280,265 | 1/1994 | Kramer et al. | 338/210 |

OTHER PUBLICATIONS

Analogus "The new "Full Body" Motion Capture–Digital Acting/Virtual Reality—Suite" *Amimation*.

Primary Examiner—Richard A. Hjerpe
Assistant Examiner—Kimnhung Nguyen
Attorney, Agent, or Firm—Flehr Hohbach Test Albritton & Herbert

[57] ABSTRACT

A man-machine interface device is provided which employs rigid links interconnected by measured revolute joints to provide the position of a hand relative to a reference location, such as a desk, keyboard or chair. By proper selection of kinematic structure, and by placing one of the joints near the elbow and extending one of the links along the line of the forearm, translation of the joint-link structure is minimized, hence the undesirable perception of friction and inertia are also minimized. When Hall-Effect sensors are used as the revolute joint goniometers, the permanent magnets of neighboring joints are placed in the same link so the effects of magnetic field interference can be calibrated out. A hand-sensing joint-link device as described herein can produce data which is more noise free, at a higher sample rate, with less latency and more robust that competing electromagnetic, optical and ultrasonic sensing technologies, without adding much encumbrance. The output from the hand-sensing device may be used to produce a graphical "virtual hand" on a computer monitor which mimics the movement of the measured physical hand. The hand-sensing joint-link device may also be used with a finger-sensing joint-link device to provide data on the movements of the fingers and hand. When a right and left finger- and hand-sensing joint-link devices are used, the wearer can use both hands to manipulate virtual objects on a computer monitor.

12 Claims, 12 Drawing Sheets

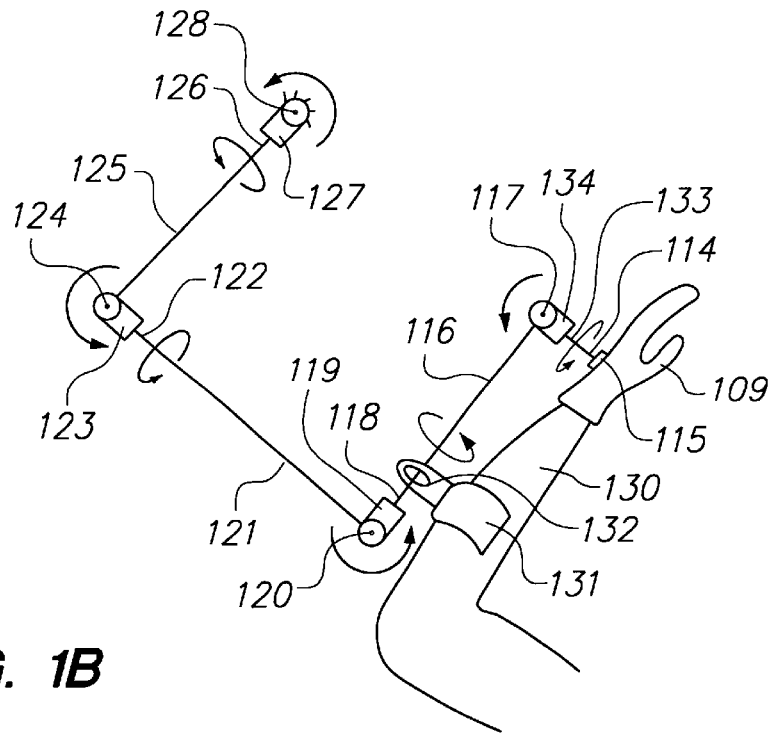
FIG. 1B
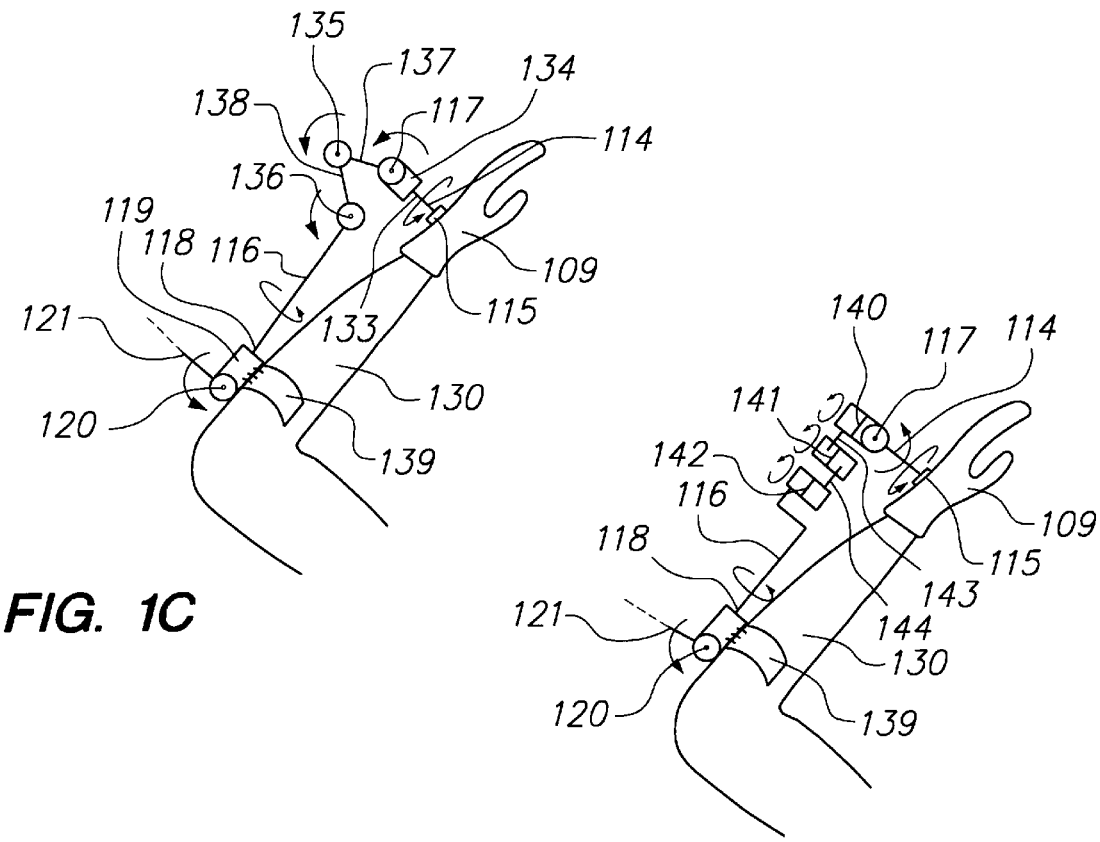
FIG. 1C
FIG. 1D

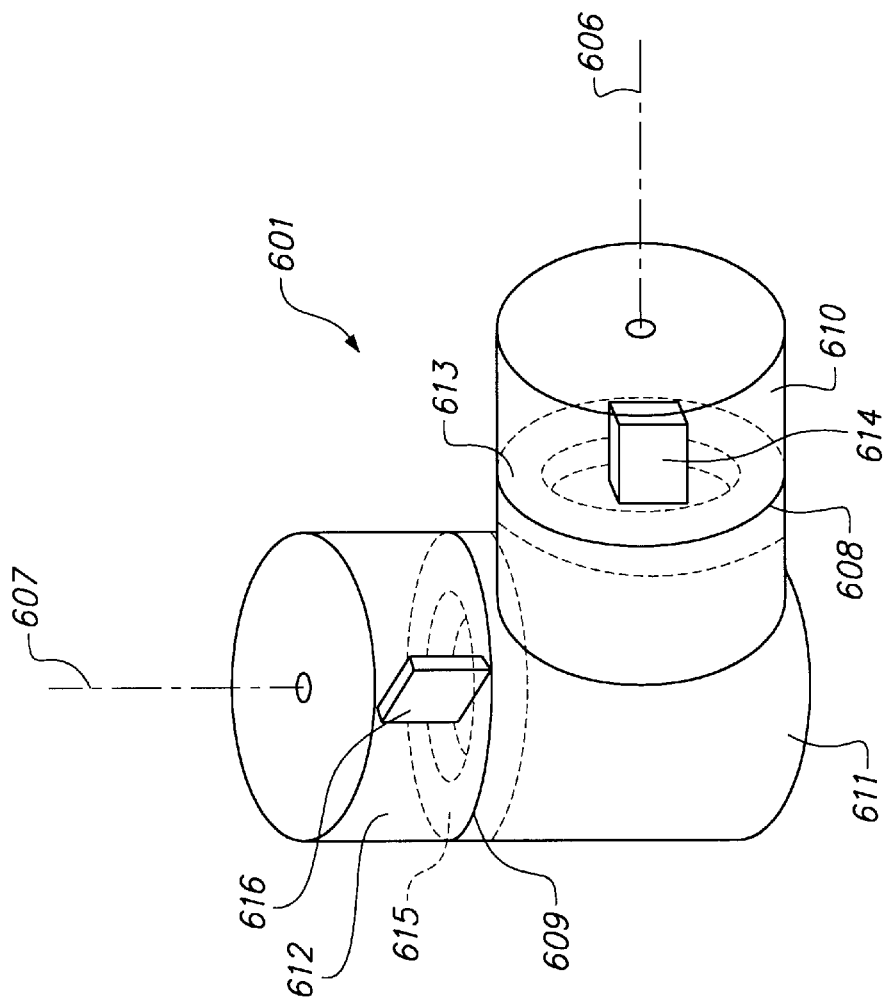
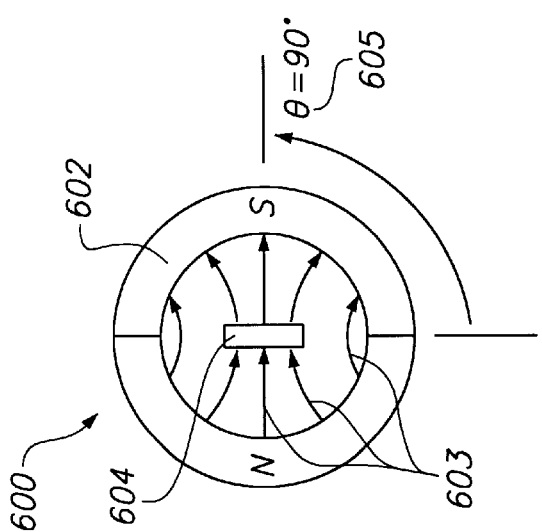
FIG. 6B
FIG. 6A

Twisting joint

Wrist joint (dual twist joint)

FOREARM-SUPPORTED EXOSKELETON HAND-TRACKING DEVICE

CROSS-REFERENCE TO RELATED APPLICATIONS

This application claims the benefit of U.S. Provisional Application No. 60/032,600 filed Dec. 11 1996, the contents of which are hereby incorporated by reference.

APPENDIX

An appendix containing software routines to convert raw digitized sensor data into joint angles and hand position is provided as Appendix I.

FIELD OF INVENTION

This application pertains to a spatial hand position and orientation device, and more particularly to a fast and accurate spatial hand position and orientation device having a plurality of links and a plurality of joints for coupling to the hand and forearm of a user that is particularly suited to interactive computer-graphic simulations and virtual reality applications.

BACKGROUND OF THE INVENTION

In the area of human computer interfaces there is the need to measure the position of the hand relative to a computer monitor. Various sensing technologies have been used to measure the position including electromagnetic (E/M), ultrasonic, infrared and mechanical linkages. Electromagnetic position sensing technology typically consists of an electromagnetic field generating transmitter and an electromagnetic field sensor. Electromagnetic position sensing technology provides the advantage that there need be no rigid physical connection between the hand and the monitor. Electromagnetic technology, however, possesses the disadvantage that it is sensitive to the presence of metallic objects and other electromagnetic interference generating sources. The electromagnetic fields generated by the electromagnetic transmitters typically adversely affect monitor image quality. Another disadvantage of E/M technology is that it typically includes lag time which renders the position data non-real time. Nevertheless, the convenience of not having bulky mechanical mechanisms attached to the body have encouraged the use of electromagnetic technology, despite its many shortcomings.

For example, the Polhemus system addresses freedom of motion requirements quite well using a tiny electromagnetic sensing element. Unfortunately, the Polhemus system depends upon a desk top transmitter whose signal is extremely sensitive to disturbance by common metal objects such as pens, keys, watches, and the like and whose signal strength falls off approximately exponentially with distance. Thus, the Polhemus system may produce noisy, uncertain data that deteriorates rapidly with distance. Additionally, the Polhemus sensing technology is understood to be too slow for virtual reality applications that aim to be convincing and transparent to the user. While the human eye can perceive stationary images flashed at rates of 30 Hz and faster as continuous movement, moderately quick limb movements can leave a 30 Hz sensing system several inches behind causing a noticeable and disorienting lag on the virtual reality display.

As with E/M position sensing technology, ultrasonic (US) and infrared (IR) position sensing technologies do not require a direct tether between the hand and monitor. US and IR technologies have the disadvantage, however, that they both require direct line of sight. Thus, when one hand passes in front of the other, the position signal can be lost. Additionally, US technology, in particular, is very sensitive to ambient acoustic noise. Both technologies can introduce lag time, again rendering the position data non-real time.

There is therefore a need for a position sensing or tracking device which is accurate, insensitive to environmental influences, has little lag time and has high data rates. Mechanical position sensing devices are desirable, which do not have the shortcomings of the other devices, while allowing for free movement without interference.

SUMMARY OF THE INVENTION

A device for measuring the position of a hand in space is provided, which comprises a hand mount and a forearm mount, means for defining a site of reference, at least 3 three links joined by revolute joints, each of said revolute joints comprising a goniometer, and one of said links positioned to parallel a forearm and supported by said forearm mount. By defining the angle at each of said revolute joints, the position of the hand in relation to the reference can be determined. The links are positioned to provide minimal interference with the free motion of the arm.

The inventive device provides a fast and accurate spatial hand positioning device to monitor and sample hand position and orientation information for high-fidelity virtual reality applications and other applications that require or benefit from such high fidelity information. The device also provides a basis for a six-degree of freedom force-feedback system. Such a device, for example, may be used by (1) automobile designers who would use the inventive device and system to test the layout and feel of a automotive interior concept; (2) architects who wish to visualize and experience a building space; and (3) aircraft and spacecraft designers who wish to test the layout, functionality, and ergonometric of cockpit and cabin design; to name only a few applications.

The inventive device advantageously requires minimal mass, size, and resistance to motion to maintain the illusion of free and unencumbered movement through the virtual landscape or space. The inventive device is capable of following the movements of the human arm and wrist and may generally allow natural interaction between both hands and arms, though not necessarily replicating the motion of individual human joints. It is also capable of operating in a variety of operational environments, including environments having sources of potential mechanical and/or electromagnetic interference. An embodiment of the inventive structure has a working space of about 5'×5'×3' and 360-degree rotational freedom in roll, pitch, and yaw while achieving spatial positioning on the order of 0.01 inches or better.

DESCRIPTION OF THE DRAWINGS

FIG. 1B is a plan view of the same showing only the left hand and arm.

FIG. 1C shows a modified version of the device of FIG. 1B, employing three parallel-axis joints.

FIG. 1D shows a modified version of the device of FIG. 1C, where the plane of the three parallel-axis joints is oriented to cover the back of the hand;

FIG. 6A is a hollow tube Hall-Effect sensor assembly.

FIG. 6B is a two-joint assembly employing two hollow tube Hall-Effect sensor assemblies such that magnetic field interference can be calibrated out;

DESCRIPTION OF THE SPECIFIC EMBODIMENTS

Figure 1A:
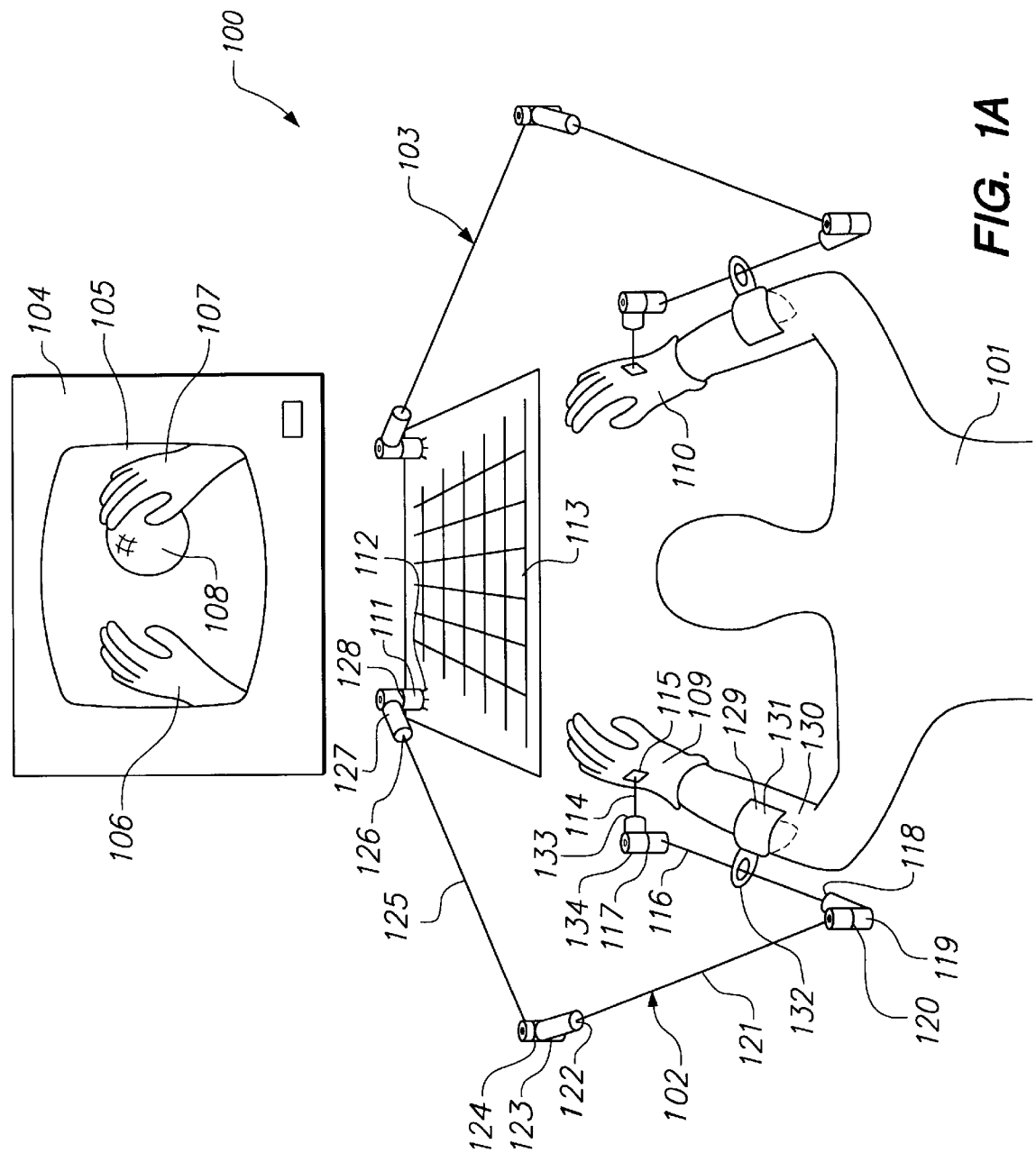
FIG. 1A is a perspective view of a right and left hand-sensing joint-link device mounted to a keyboard.

The inventive structure may include mechanical, electronic, and computational components. The mechanical portion primarily comprises a plurality of linkage or link elements, joints connecting the link elements, and sensors which provide information in the form of electronic signals indicating relative position and orientation of link elements as reflected by their position at the joints connecting those linkage elements.

The electronics components of the system includes the goniometer such as sensors, power supply, and sensor signal processing electronics, as well as a computer with memory for computing the position and orientation or tracking the hand. The goniometer sensor elements are disposed physically among the link and joint mechanical elements and sensing the angle of a joint. Such sensors may for example employ optical, electronic, or magnetic sensing means as are known in the art. For example, optical encoders may be used, electromechanical strain-gauge based sensors may be used, the Hall-effect sensors which receive power and ground, and generate an output signal indicative of an orientation of a Hall-effect sensor element in a magnetic field as are described relative to several embodiments of the invention may be used, or any other sensor having appropriate physical size and meeting the angular resolution requirements of the particular joint may be used. Different sensors may be used for different joints as well. For example, some joints (the joints near the reference location or base may be subject to only small deviations from a nominal angle but require relatively greater angular resolution, while other sensors may require the ability to detect lager angular deviation, perhaps with a lesser degree of angular resolution.

The Hall-Effect sensor assembly comprises the Hall-effect element and a permanent magnet and is coupled to processing electronics including A/D converters for converting the analog sensor output signal to a digital signal compatible with a processor system such as a microprocessor-based computer. Software for processing the signals and for interpreting the inputs from the spatial hand positioner are also provided. These electronic, computational, and software components are described in greater detail after the mechanical configuration of the inventive device structure is described.

A device is provided for relating the position of a hand to a reference link employing solid links and revolute joints comprising individual goniometers. The information from the device can be used to depict the arm movements on a monitor, or to create or modify a database in the memory in or associated with a computer for such arm movements, positions, and orientations. Included in the device is a relatively immobile reference, which is maintained reasonably stationary during the measurement of the hand position. The device employs at least three links joined by revolute joints.

When referring to joints and links, terminology commonly used in the art of robotics will be used. In brief, the term "joint" refers to an axis of rotation, and "link" is the term referring to the physical structures which articulate about the joint axis. In practice, however, to create a joint, typically link-mounting structures are created to which the majority of the bulk of each link, for instance a tube or rod, is ultimately affixed. In the degenerate case where two or more joint axes intersect, a theoretical link of zero length is defined to exist between the axes.

In the device, one of the links, the forearm link, mimics the forearm, extending substantially the length of the forearm from the elbow to the wrist. The forearm link passes through a channel supported and maintained in position by a forearm mount. The forearm mount is secured in position on the forearm by any of a variety of holding means, such as clips, clasps, bands secured with fasteners or Velcro®, or the like. The channel may take the form of a rigid ring, an oar channel, or other restraint, which allows for the free movement of the forearm link through the channel.

The forearm link is connected at the hand proximal end to means for fastening the end of the forearm link to the hand. The means is conveniently a strap that can be secured between the thumb and forefinger and extends over the back of the hand and across the palm of the hand. If desired, a partial or complete glove may be used instead of the strap. Other fastening means may also be employed. The forearm link is connected to the hand fastening means through a revolute joint and a short link which is secured to the hand fastening means at the back of the hand. Conveniently, the forearm link may have a bend, particularly a right angle bend, near the hand proximal end, for attachment to the revolute joint.

The forearm link is connected to the reference through a train of at least two links, the train terminating in a revolute joint attached to a reference link. The reference link may be a rigid connector to a rigid support, a solid heavy block or other reference which defines a particular site to which the position of the hand may be related. Conveniently, it may be a heavy block which will maintain its position while the arm is being moved, but can be moved to a different site, when desired. The block may also serve to include electronics, wires, electrical connectors, or the like.

The links will be light weight rods, including tubes, generally of from about one-eighth to three quarters inch in diameter, usually of from one-quarter to one-half inch diameter. The materials should be light weight, strong and rigid. A convenient material is carbon fiber tubing.

There will be at least 3 links, generally at least 5 links, more usually at least 8 links and conveniently 9 links, and generally not more than 12 links. Of the links, there will usually be at least two long rods of greater than about six inches in length and not more than about 24 inches in length. Of course those workers having ordinary skill in the art in light of the description provided herein will appreciate that these dimensions are exemplary and are related to the typical dimensions of the human operator 101, and that the invention itself is not so limited to structures having a particular set of dimensions.

The goniometers may take a variety of forms, such as Hall-Effect sensors, variable-resistance strain sensors, optical encoders, potentiometers, and the like. Of particular interest is the situation where two or more joints are connected by a short link and where Hall-Effect sensors are the goniometer of choice. In such an arrangement at least two permanent magnets are affixed to the common link, and a Hall-Effect sensing element is located in each of the remaining links associated with the two joints. As such, even though the magnetic fields generated by each of the two permanent magnets may overlap, the resulting magnetic field pattern remains constant, regardless of the movement of either of the two joints which incorporate the sensing elements.

Hall-Effect sensors provide an analog output voltage which can be amplified digitized to a desired resolution by external circuitry. Since one of the advantages of the inventive device provides that hand-distal joints, i.e., joints at or near the reference location, typically move very little when the hands are manipulating an object, the angle range of such hand-distal joints is typically very small. Thus, the analog Hall-Effect sensor output can be amplified and digitized to a resolution necessary to detect and resolve the small joint movements. If an optical encoder were employed as the joint goniometer, since such encoders are digital and have fixed resolution, if a relatively small size optical encoder were used, small angle movements might not be adequately discriminated.

Another advantage of using Hall-Effect sensors is their small dimensions and weight. Most high resolution optical encoders require much larger packaging to house the large diameter encoder wheel than is required to package appropriate Hall-Effect sensing components.

For interfacing the linkage system to the hand, various mounting devices may be employed. These may include straps, gloves, clips, or the like. The mounting devices will include a reinforced region to which a link may be connected. The region may be reinforced cloth, a plate, e.g. plastic, to which the link may be fastened, or the like.

For further understanding of the inventions, the drawings will now be considered. Unless otherwise specified in describing the elements of the drawings, when referring to a joint, a revolute joint is intended, and the cylindrical icon used in the drawings to denote the revolute joint contains angle-sensing means even though such angle sensing means is not specifically shown in the drawings in the interest of preserving clarity.

Each revolute joint or combination of revolute joints may be chosen to provide the desired hand-tracking functionality, and the invention is not limited to particular joints types or characteristics at each revolute joint location. However, in one embodiment of the invention there are provided joints which may be characterized as one of three types: bending type joints, twisting type joints, wrist type joints, or combinations thereof. While the distinctions between the types are subtle, and the type of joint provided at one location may be changed without significant effect by suitable change at another location. A bending joint may generally provide rotation about an axis generally perpendicular to the long axis of the link element. A twist type joint provides rotation about an axis aligned generally parallel to the long or longitudinal axis of the link element. A wrist joint has the functionality of a combination of two rotations each similar to the twist joint. These joint types may be combined into a single integrated structure to which the links may also be attached or clamped, so that characterization of a joint as one particular type somewhat subjective. These generic revolute joints types are described relative to particular implementations for particular embodiments in greater detail later in the specification; however, in general we will simply refer to them as revolute joints or simply joints.

The cylindrical icons may optionally also incorporate computer controllable torque-generating means such as electrical, pneumatic or hydraulic motors, and the like. The cylindrical icons may also incorporate computer controllable rotation-inhibiting means, such as brakes, clutches, and the like. Torque-generating means and rotation inhibiting means need not reside explicitly inside the cylindrical icons, but instead, may be transmitted to the icon location by cable-pulley and cable-sheath techniques, such as described in U.S. Pat. No. 5,184,319, the contents of which are hereby implicitly incorporated into this application by reference. Other torque-generating means and rotation-inhibiting means are known in the art and the specific details are not therefore explicitly reiterated herein.

In FIGS. 1A and 1B, a system 100 is depicted comprising a person 101 on which left 102 and right 103 hand sensing joint-link devices are mounted. Whereas FIG. 1A is a perspective view, FIG. 1B is a 2-dimensional plan view of a hand-sensing joint-link device. Monitor 104 renders a graphical representation 105 of virtual hands 106 and 107, with hand 107 holding virtual object 108. Gloves 109 and 110 are worn on the physical hands of person 101. The gloves may be any hand sensing device, which measures the configuration of the hand. See, for example, U.S. Pat. Nos. 4,542,291, 5,280,265, 4,986,280 and 5,086,785, the contents of each of which patents are hereby incorporated into this application by reference.

The embodiments illustrated in FIGS. 1A and 1B, as well as those in many of the other figures, provide useful kinematic structures providing specific arrangements of links and joints. Various modifications to the kinematic structures presented, such as where links and joints are added or subtracted, or where joint orientations are altered, may be made without departing from the scope of the invention.

Only one of the left and right hand-sensing joint-link devices in FIGS. 1A and 1B will be described, since they are mirror images of each other, and except for the mirrored structure have the same features and principles of operation.

Hand-sensing joint-link device 102 is anchored by a hand distal terminal link 111 at a reference site 112, shown as a portion of keyboard 113. The reference site may include a base attachable to the surface and which may optionally house some or all of the electronic components exclusive of the sensors (described hereinafter). However, other suitable locations for the reference site may be used. Conveniently, the hand distal terminal link 111 is affixed to a plate, surface, or other support on which keyboard 113 may rest. A hand proximal terminal link 114 is affixed to glove 109 at an appropriately reinforced portion 115 of glove 109. Glove 109 can be any means by which reinforced portion 115 can be held firmly in moving relationship to the hand. Joint 133 connects terminal link 114 to link 134. Forearm link 116 is connected by joint 117 to link 134, and forearm link 116 is further connected by joint 118 to intermediate link 119. Link 119 articulates with respect to link 121 via joint 120. Link 121 is connected via joint 122 to link 123; link 123 is connected via joint 124 to link 125; and link 125 is connected by joint 126 to link 127, which articulates with reference link 111 via joint 128.

Forearm link 116 is supported and guided by forearm mount 129 which is affixed to forearm 130 by means of clip 131. Forearm mount 129 comprises a loop 132 through which the forearm link 116 extends. Loop 132 transfers the weight of the joint-link device 102 to the forearm 130. Forearm link 116 as it passes through loop 132 is able to translate and rotate relative to the forearm. The loop 132 is necessary to the configuration of the joint-link device 102, since link 121 is required to translate relatively large distances as the glove 109 moves. Without loop 132 all inertia and weight of joint-link device 102 would be supported by glove 109 and thus felt at the much weaker wrist joint of the person, than the much stronger shoulder. The friction between forearm link 116 and the loop 132 helps transfer to the shoulder inertial forces resulting from movement of the forearm along the long axis of the forearm. The transfer of the inertial forces from the wrist to the shoulder reduces the perception of the weight of the device to the user. The friction should not be so great as to interfere with wrist movement.

As shown in the figure, since the axis for joint 128 is perpendicular to the tabletop, the entire hand-sensing joint-link device structure from link 111 to joint 122 is supported by the reference link 111. This is an advantage as it removed the weight from the user's hand. As the user's hand moves around, translation of joint 124 is confined to move along a plane parallel to the tabletop, to the side of the keyboard, and conveniently and safely out of the way. Note that link 125 could be positioned to articulate along a vertical plane along side the monitor, however, as the hand and elbow are pulled back, joint 124 would tend to fall away from the monitor and possibly undesirably contact the user's head or body.

By locating joint 120 near the user's elbow, since the elbow doesn't translate as much as a hand during a typical manipulation task, the sensitivity to inertia and friction is minimized. Hence, for most manipulation tasks, only the inertia and friction of the links and joints positioned between the elbow and hand are detected by the user.

FIG. 1C provides a plan view of an alternate hand-sensing joint-link device where the freedom for forearm link 116 to slide relative to loop 132 is replaced by two additional revolute joints 135 and 136. Joints 117, 135 and 136 preferably have parallel axes of revolution. Link 137 connects joint 135 to joint 117, and link 138 connects joint 135 to joint 136. Joint 136 in turn connects to forearm link 116. Forearm link 116 rotates via joint 118 relative to link 119, which in FIG. 1C is rigidly affixed to forearm clip 139. Link 119 is connected by joint 120 to link 121. The remainder of FIG. 1C is the same as FIG. 1B. The advantage of using three parallel-axis revolute joints is that frequently, revolute joints produce less friction than a prismatic joint, or other situations where an axle slides linearly along a hollow tube guide. One disadvantage of the embodiment shown in FIG. 1C is that as the physical hand extends backward, joint 135 extends farther from the hand, increasing the profile which is desirably kept to a minimum.

FIG. 1D, similar to FIG. 1C, there are again three parallel-axis revolute joints, now denoted 140, 141 and 142, interconnected by links 143 and 144. In contrast to FIG. 1D, joints 140–142 are oriented such that as the hand extends backward, joint 141 either extends up off the page, or into the page. Thus, the profile of the three joints as shown does not change with wrist flexion. In FIG. 1D, joint 133 is unnecessary, and link 134 simply becomes link 114. Other joints and links are similar to those defined in FIG. 1C.

Figures 2, 4:
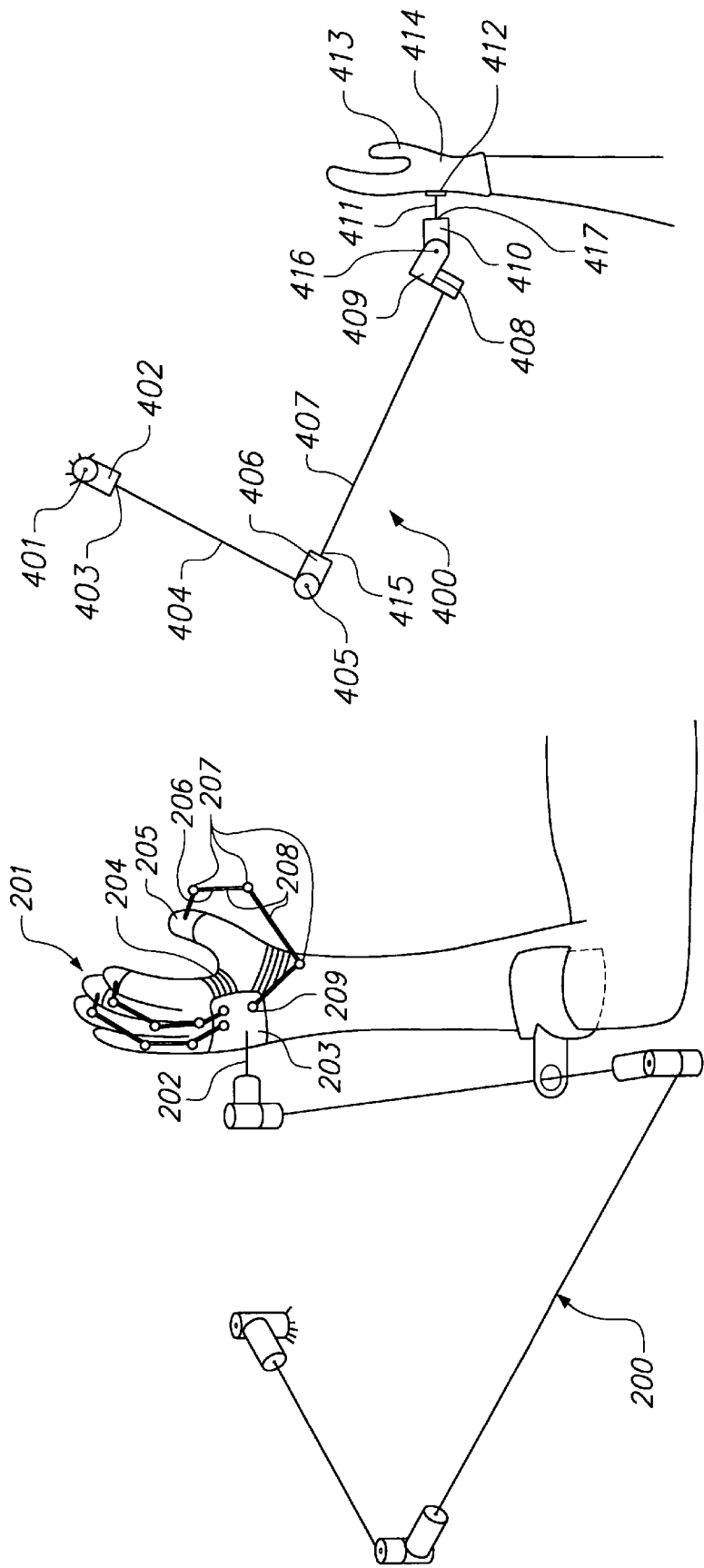
FIG. 2 is the left hand-sensing joint-link device attached to a finger-sensing joint-link device on the hand.
FIG. 4 is a simplified left hand-sensing joint-link device, with the primary advantage of weight support.

In FIG. 2, the subject hand-sensing joint-link device 200 is combined with a finger-sensing joint-link device 201. The hand proximal terminal link 202 is affixed to a metacarpal mounting plate 203. Mounting plate 203 is secured to the dorsal side of the metacarpus by an elastic strap 204. Alternatively, the mounting plate may be substituted with other attaching means, such as a clip. Extending from plate 203 to at least one of the fingertips 205 is a kinematic structure 206, which measures the position of the fingertip relative to plate 203. Knowing the relative position of the fingertip and using inverse kinematics on the physical finger, the joint angles of the finger can be determined and, hence, a virtual hand may be optionally rendered on a monitor. The kinematic structure 206 is comprised of joints 207 and 209, connecting a plurality of links 208. The kinematic structure 206 typically comprises three parallel joints 207 and one non-parallel joint 209, each with an associated goniometer. Non-parallel joint 209 provides for finger abduction/adduction, while joints 207 provide for finger flexion/extension. A link-joint based hand sensing device is described in U.S. application Ser. No. 08/957,696, filed Oct. 24, 1997, entitled, "An Exoskeleton Device for Directly Measuring Fingertip Position and Inferring Finger Joint Angle," which application is hereby incorporated by reference.

When a clip is used to secure the hand-sensing joint-link device to the arm, or when a clip is used to secure the finger-sensing joint-link device to the hand, the donning of such clip may be computer assisted. Computer-assisted donning of the clip will greatly enhance the efficiency of the user interface to such a device for daily computer use. For example, the device holding the clip is suspended while the user inserts his/her arm or hand into the clip. Voice command or a button may be used to initiate closing of the clip. Alternatively, an optical detector such as and infrared emitter-detector pair may be embedded to the inner surface of one of the clips. When the inserted body part is detected to be within a desired proximity, the clip is commanded by the computer to automatically shut. Pressure sensors are optionally used on the clip to feedback the clipping force so the computer can command the precise force. The closing force may be actuated using shape-memory metals such as Ni—Ti. Actuation may also be accomplished via routing of tendons in a sheath, from a remote actuator of desired technology, out to the clip, which clip is pulled shut by such tendon. Various other techniques may be suitably employed to accomplish the automation of donning the device. To doff or remove the device, various techniques may be used, such as pressing a button on the clip or keyboard, voice command, or the like.

Figure 3:
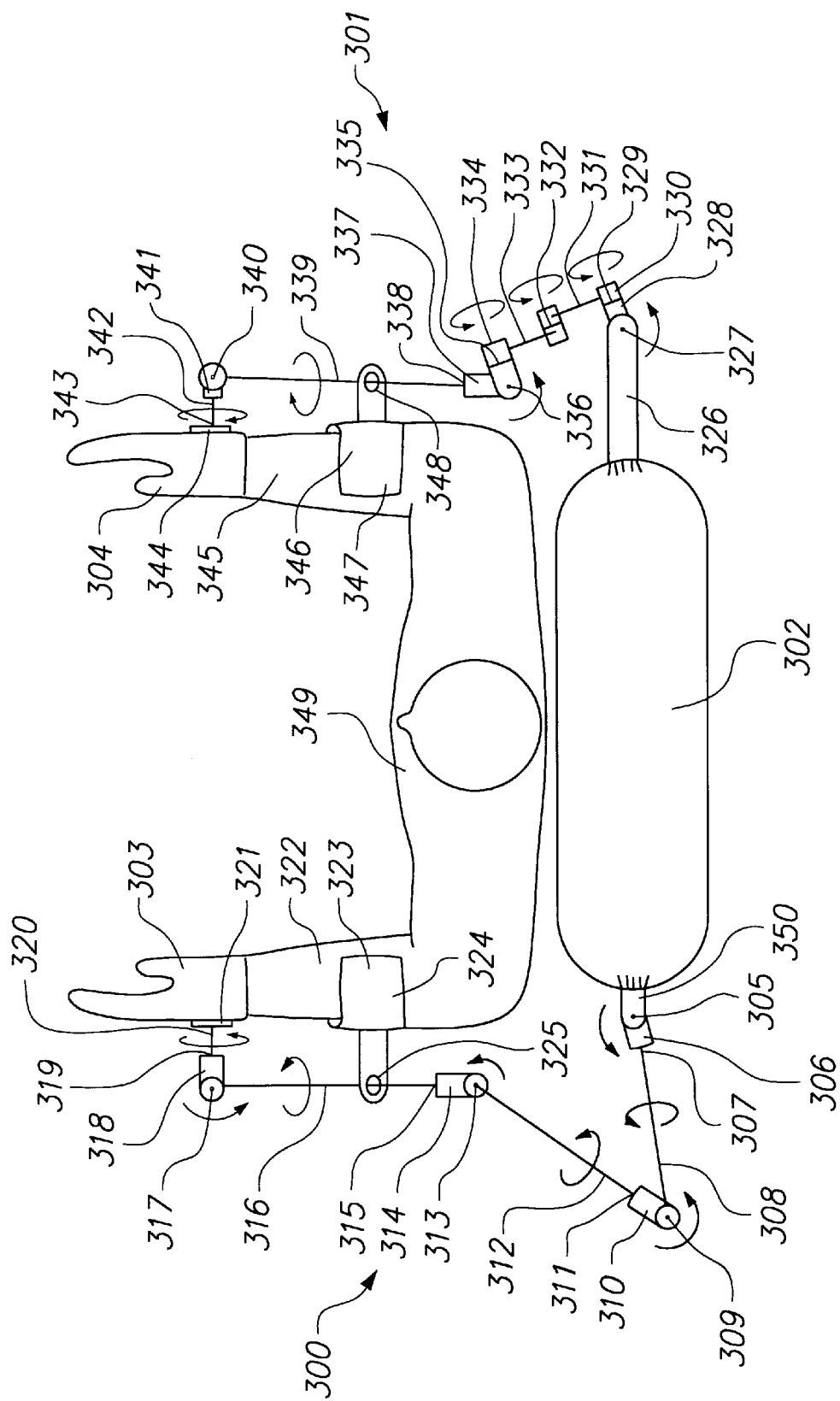
FIG. 3 is a plan view of embodiments of a right and left hand-sensing joint-link device where each device is referenced to a chair.

FIG. 3 is a plan view of two different embodiments of a hand-sensing joint-link device attached to a chair or other such object with known spatial placement, which provides a reference location. Left hand-sensing joint-link device 300 is attached by the hand distal terminal link 350 to the chair 302, and by the hand proximal terminal link to the left hand attachment means 303, shown here as a glove-like hand covering. Similarly, right hand-sensing joint-link device 301 is attached by the hand distal terminal link 326 to the chair 302, and by the hand proximal terminal link to the right hand attachment means 304, shown here again as a glove-like hand covering. Hand attachment means 303 and 304 may be straps, clips or the like, and may cover all or a portion of the hand.

One principle distinction between the structures of hand-sensing joint-link devices 300 and 301 is the orientation of two joints. For the left hand-sensing joint-link device 300, joints 309 and 311 are replaced by joints 332 and 335 in the right hand-sensing joint-link device 301. For the left device, joint 309 nominally remains at the same elevation from the base of the chair, independent to movement of joint 305. In contrast, for the right hand-sensing joint-link device 301, the three joints 329, 332 and 335 have parallel axes. As shown, joint 332 is at a lower elevation relative to the base of the chair 302 than joints 329 and 335. Thus, as the right hand moves away from the body 349 of the human, joint 332 moves up. Alternatively, joint 332 may be at a higher elevation than joint 329 and 335, hence, as the right hand moves away, joint 332 descends in elevation. The advantage of the three-parallel joint axis structure as employed on hand-sensing joint-link device 301 as opposed to device 300, is that extension of the hand from the body doesn't significantly alter the projection from above of the device, as is not the case with device 300. The advantage of hand-sensing joint-link device 300 as opposed to device 301 is that in device 300, joints 309 and 311 are supported by joint 305, hence their weight is not appreciably noticeable when moving the left hand, although their inertia is still apparent. In contrast, joint 332 of device 301 is only supported by the right hand and forearm, thus, even when there is no motion of the right hand, additional force due to the unsupported weight is perceived by the right arm.

FIG. 4 provides a plan view of a simple hand-sensing joint-link device 400 which can be mounted at the hand distal terminal link to a keyboard, chair or other object of known spatial placement to act as a reference site. For this device, joint 401 connects link 402 to the reference site; joint 403 connects link 404 to link 402; joint 405 connects link 406 to link 404; joint 415 connects link 406 to link 407; joint 408 connects link 409 to link 407; joint 416 connects link 410 to link 409; joint 417 connects link 411 to link 410; and finally link 411 is connected to mount 412 which is attached to hand attachment means 413 which covers all or a portion of hand 414. This embodiment does not provide many of the advantages provided by the embodiment described thus far. It does, however, possess the advantage that the weight of joints 405 and 415 are supported by joint 401 when joint 401 is oriented perpendicular to the ground.

Figure 5B:
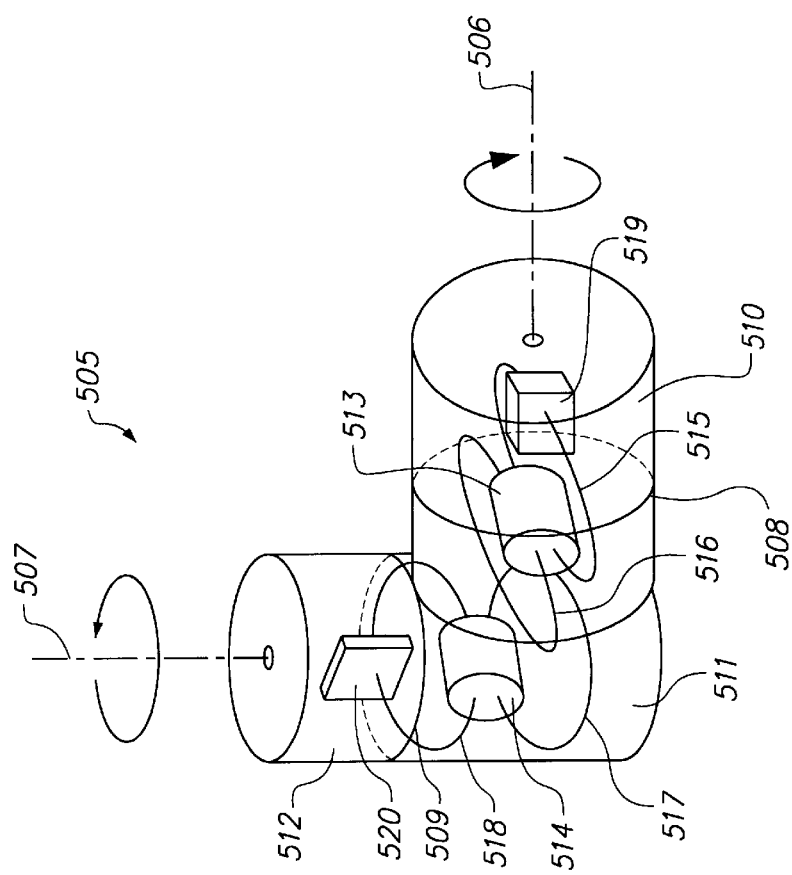
FIG. 5B is a two-joint assembly employing two Hall-Effect sensor assemblies such that magnetic field interference can be calibrated out.
Figure 5A:
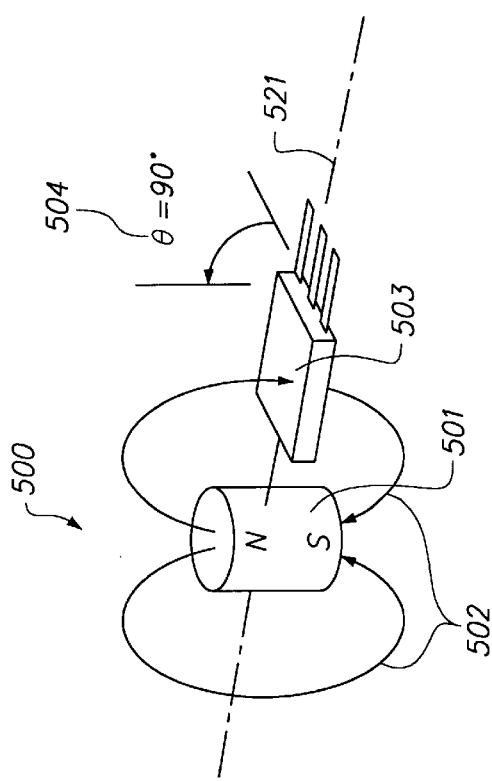
FIG. 5A is a Hall-Effect sensor assembly.

FIG. 5A is one embodiment of a Hall-Effect sensor assembly 500; and FIG. 5B is an embodiment of a dual-joint structure 505 employing two Hall-Effect sensor assemblies. In FIG. 5A, permanent magnet 501 produces magnetic field lines 502. Permanent magnet 501 can be made from a variety of suitable materials, including "rare earth" substances. Hall-Effect sensor 503 is placed in functional proximity to the magnet 501, such that magnetic field lines 502 can reach sensor 503. The orientation of sensor 503 as shown, that is with angle 504 about axis 521 at 90 degrees, is the sensor angle which will produce the maximum sensor output signal. Alternatively, if and 504 were zero (0) degrees, the sensor would be at the poorest angle for intercepting magnetic flux and produce its minimum signal voltage. Theoretically, the Hall-Effect sensor output voltage varies sinusoidally as the sensor is rotated to different angular orientations through the magnetic field. In practice, it is typically preferable to field calibrate the sensors so that joint angle is known to a high accuracy and precision as a function of sensor voltage. Any of a wide variety of calibration techniques may be employed. For example, after recording a set of sensor angles versus sensor outputs, an analytic curve can then be fit through the data set, or, alternatively, each data point can be used to interpolate (either linearly, sinusoidally, through the use of a look-up-table, or otherwise) and estimate the angle for any intermediate future sensor output value.

In one embodiment of the inventive structure the Hall-effect sensor element 503 was manufactured by Alegro (Part No. A3507LU), and the permanent magnets 501 were neodymium magnets (Part No. 5862K51). The Hall-effect active sensor element had dimension of 4.6 mm×4.6 mm×1.6 mm, a bandwidth in excess of 20 kHz, and a low noise output in the range of 125 µvolt.

FIG. 5B incorporates two Hall-Effect sensors to measure the angle about two joints 508 and 509, which rotate about axes 506 and 507, respectively. The joint axes are arbitrarily shown in FIG. 5B to form a right angle. Joint 508 allows link 510 to rotate relative to link 511, while joint 509 allows link 511 to rotate with respect to link 512. Ideally, only magnetic field lines 515 of magnet 513 affect Hall-Effect sensor 519; and only magnetic field lines 518 of magnet 514 affect Hall-Effect sensor 520. In the case as shown, if the joints are closely situated, the magnetic field lines 516 of one magnet 513 might interfere with the magnetic field lines 517 of the other magnet 514. Thus, the Hall-Effect sensor 519 associated with the magnet 513 might be affected by the magnetic field produced by the neighboring magnet 514, and vice versa. To minimize the effect of the rotation of one joint on the other, the magnets must be held in constant relationship to each other, that is, they must be firmly positioned in the common link of the two joints as shown. Thus, even though the magnet 513 might produce a magnetic field which influences the signal detected not only by Hall-Effect sensor 519, but also sensor 520, the relationships between angle and voltage output of the sensors will be repeatable. Hence, the relationships can be calibrated to provide useful joint-angle data. Additionally, if magnetic fields either interfere or are interfered with, mu-metal shielding may be used in and around the joints to form a magnetic field barrier.

FIG. 6A shows a Hall-Effect sensor assembly 600 comprising a hollow tube magnet. FIG. 6B shows a two-joint structure 601 employing two hollow-tube-magnet Hall-Effect sensors assemblies. In FIG. 6A, hollow tube magnet 602, made from any suitable magnetic material, produces field lines 603. Hall-Effect sensor 604 (end view shown) is positioned in the interior of the magnet. In the orientation shown, where the sensor is at an angle 605 of 90 degrees, the signal produced by the sensor is maximized. At an angle of 0 degrees, the signal produced by the Hall-Effect sensor would be minimized relative to the signal at other angular orientations.

FIG. 6B incorporates two hollow-tube-magnet Hall-Effect sensors to measure the angle about two joints 608 and 609, which rotate about axes 606 and 607, respectively. The joint axes are arbitrarily shown in FIG. 6B to form a right angle. Joint 608 allows link 610 to rotate relative to link 611, while joint 609 allows link 611 to rotate with respect to link 612. Ideally, only magnetic field lines of magnet 613 affect Hall-Effect sensor 614; and only magnetic field lines of magnet 615 affect Hall-Effect sensor 616. As was the case with the arrangement provided in FIG. 5B, in the case as shown, if the joints are closely situated, the magnetic field lines of one magnet 613 might interfere with the magnetic field lines of the other magnet 615. Regardless, since the magnet is hollow and polarized such that the field lines pass from one side of the tube to the other, not as many field lines escape to cause interference. Even with the reduction in magnetic field lines escaping, it is still preferable, to hold the magnets in constant relationship to each other, that is, they should be firmly positioned in the common link of the two joints as shown. Thus, even though the magnet 613 might produce a magnetic field which influences the signal detected not only by Hall-Effect sensor 614, but also sensor 616, the relationships between angle and voltage output of the sensors will be repeatable. Hence, the relationships can be calibrated to provide useful joint-angle data.

Figure 7C:
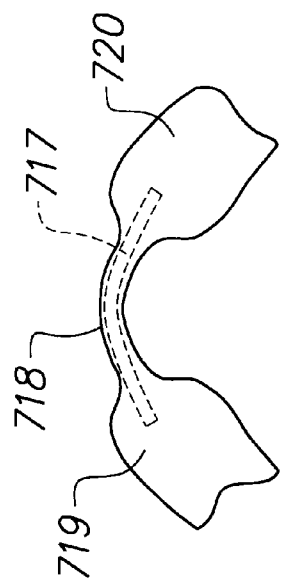
FIGS. 7B–7D are three goniometer assemblies employing the variable-resistance strain-sensing goniometer.
Figure 7D:
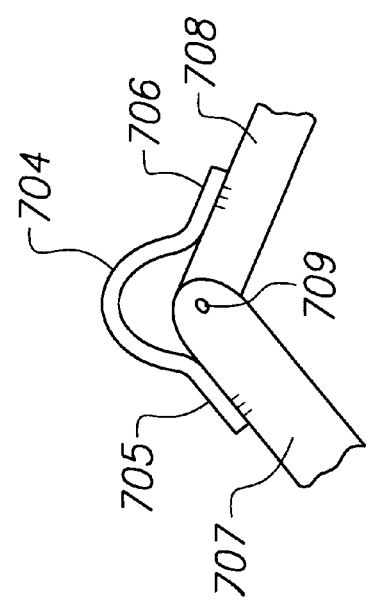
Figure 7A:
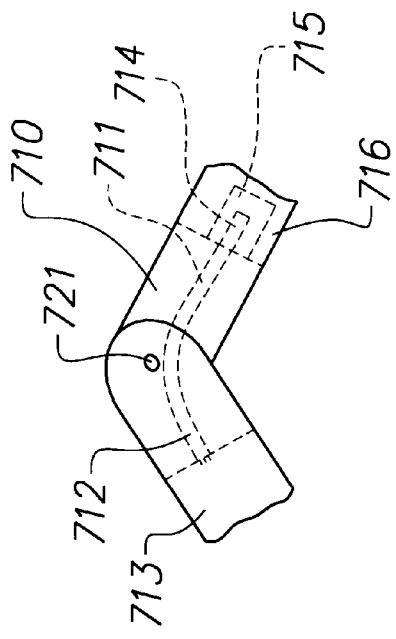
FIG. 7A is a variable-resistance strain-sensing goniometer.
Figure 7B:
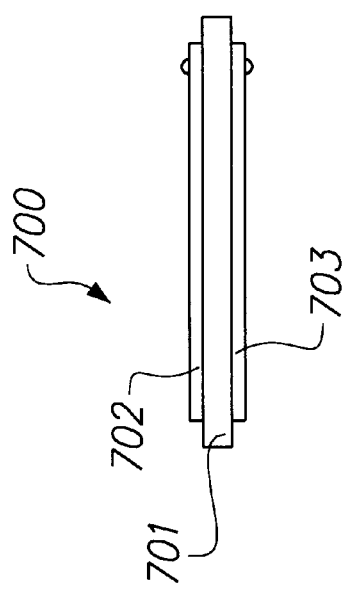

FIG. 7A is a side view of a variable-resistance strain-sensing goniometer 700 as described in U.S. Pat. No. 5,280,265, issued Jan. 18, 1994, the contents of which are hereby incorporated into this application by reference. Such a goniometer sensor 700 finds use in creating goniometer assemblies, such as shown in FIGS. 7B, 7C, and 7D, which may be used to sense joint angles in the various revolute joints of the subject invention. Regarding FIG. 7A, to each side of a flexible insulating backing are mounted top and bottom variable-resistance strain-sensing elements 702 and 703. Typically, the two elements 702 and 703 form two legs of a Wheatstone bridge circuit. Theoretically, such a variable-resistance strain-sensing goniometer structure produces an output proportional to the angle between the tangents of the ends of the sensor. In FIG. 7B, the ends 705 and 706 of the sensor 704 are firmly affixed to links 707 and 708, respectively. Links 707 and 708 articulate relative to each other about revolute joint 709. Thus, the output of the sensor 704 provides a signal in proportion to the angle between links 707 and 708.

In FIG. 7C, variable-resistance strain-sensing goniometer 711 resides in a hollow region 710 between the hinge point 721 connecting link 713 to link 716. As shown, one end 712 of the sensor 711 is firmly affixed inside the hollow region 710 to link 713, while the other end 714 is guided in a channel 715 in link 716. Alternatively, both ends could be firmly affixed to the respective link inside the hollow region, or, both ends could be guided in channels in the respective links. Since, in any case, the tangents at the ends of the sensor 711 is held tangent to the links, the signal from the sensor is proportional to the angle between the links.

In FIG. 7D, variable-resistance strain-sensing goniometer 717 is molded into a "living hinge" structure where the narrow portion 718 between wider link portions 719 and 720 forms the hinge. Note that for clarity of exposition of the invention, the electrical connections are not shown in any of FIGS. 7A–7D.

Figure 8A:
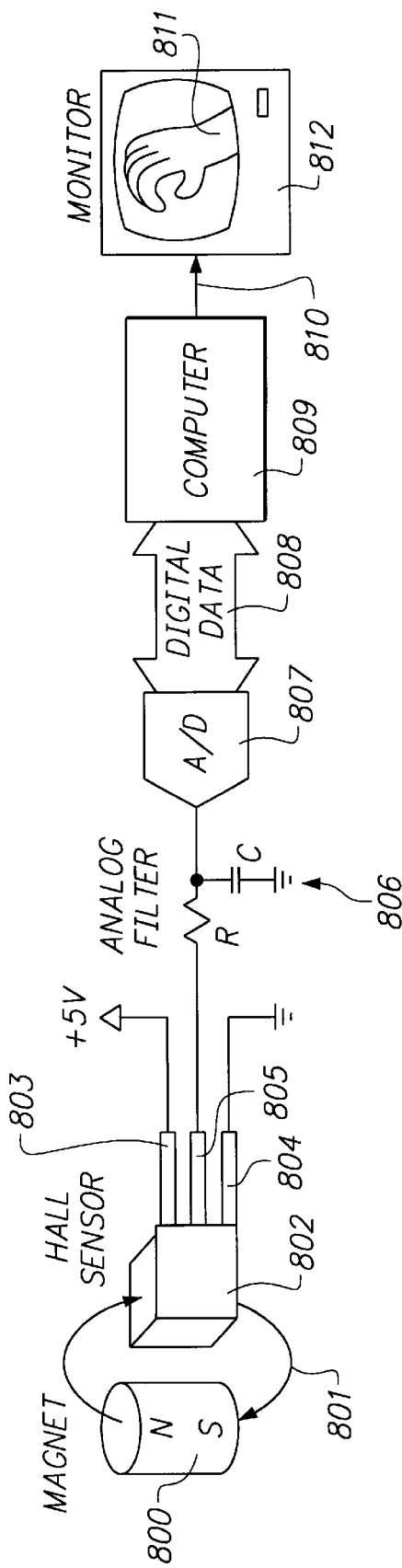
FIG. 8A is a signal flow diagram from Hall-Effect revolute joint goniometer sensor to computer monitor display.
Figure 8B:
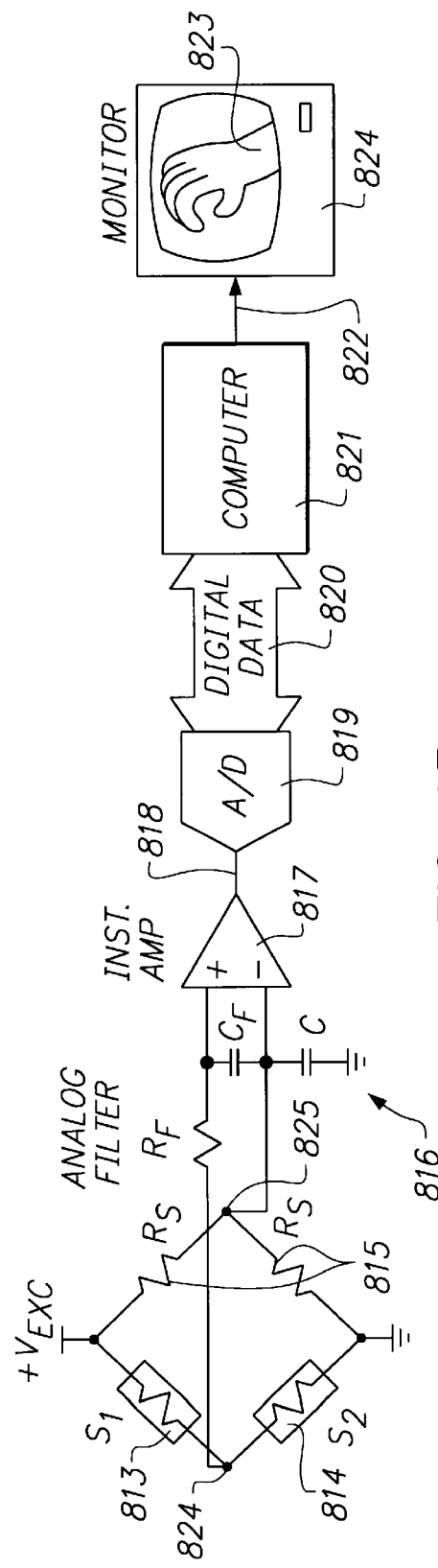
FIG. 8B is a signal flow diagram from variable-resistance strain-sensing goniometer sensor to computer monitor display.
Figure 13:
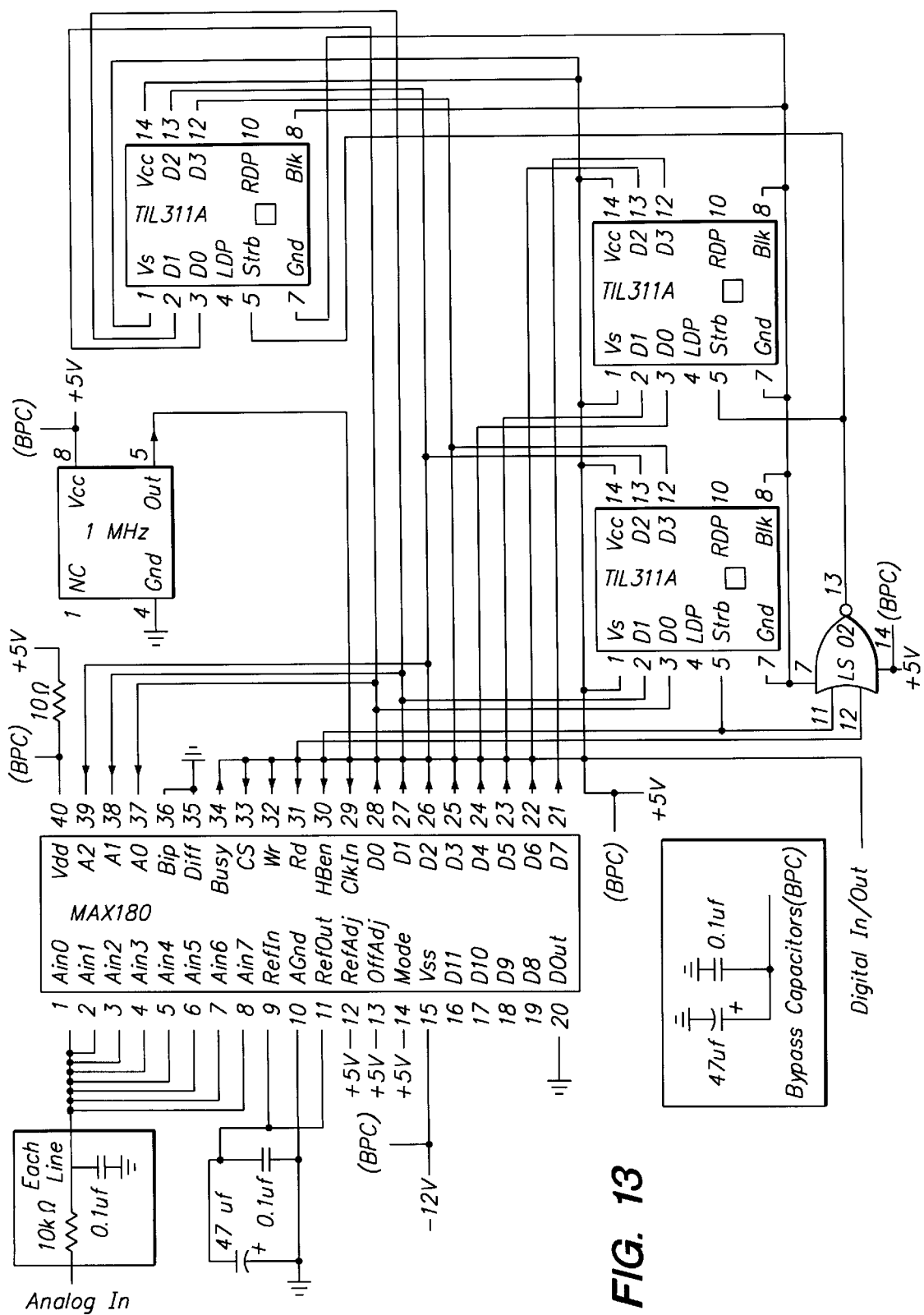
FIG. 13 is a diagrammatic illustration showing aspects of the signal processing electronics.

FIGS. 8A and 8B provide the block diagrams for systems incorporating revolute joints with Hall-Effect and strain-sensing goniometer sensors. In FIG. 8A, the magnet 800 produces magnetic field 801 which is detected by Hall-Effect sensor 802 in proportion to the angle sensor 802 makes with respect to the magnet 800. One terminal 803 of the sensor 802 is connected to electrical power, one terminal 804 is connected to electrical ground, and one terminal 805 is the signal output. The signal output pin 805 is connected to an analog filter 806 which then provides the filtered signal to an analog-to-digital (A/D) converter 807. Acceptable values for an analog R-C filter are R=10,000 ohm, and C=0.1 $\mu$F, although many other suitable values may be used. Any suitable A/D may be used, such as a Maxim MAX180 or MAX181. Characteristics of the MAX180 and MAX181 and the implementation within the circuit are described subsequently with respect to the circuit diagram in FIG. 13.

Note that when the MAX181 is used, a programmable gain circuit may be inserted between the "MUX output" pin and "A/D input" pin so the signal-to-noise ratio may be optimized for each joint according to its dynamic range. The digitized data 808 is input into a computer 809. The computer uses knowledge of the kinematic structure of the hand-sensing joint-link device and converts the joint angle data into hand-position data (See Appendix I for software program listing). The hand position data is optionally converted by a computer program into a signal 810 that produces a graphical image of the hand 811 on a computer monitor 812. A commercial computer program capable of converting hand position data into such a signal 810 is the VirtualHand® Toolkit Library, by Virtual Technologies, Inc., Palo Alto, Calif.

The Maxim MAX180 is a single chip solution for a 12-bit data acquisition system. The Maxim MAX180ACPL provides eight channel multiplexed inputs with a maximum error of ±½ LSB. The MAX180 uses an 8- or 12-bit parallel microprocessor interface. An A/D chip with a parallel interface may advantageously be used and provides better performance than a serial interface by accommodating the relatively high refresh rates (100 Hz minimum and 1000–2000 Hz desirable). An optimal refresh rate of greater than 2000 Hz would typically be beyond the performance range of generally available serial interfaces even for interfacing a minimalist 12-bit×8-channel×8-control bytes. Even using the parallel interface, a bi-directional port having eight data lines input was utilized in one embodiment of the invention in order to achieve the high data transfer rates desired.

The Maxim MAX181 chip may also be used, and is generally similar to the above described MAX180 chip having compatible pin functionality, except that it only has six multiplexed inputs instead of the eight provided by the MAX180. The two remaining pins are used for a multiplexer output (Mux_Out) and A/D Converter Input (A/DC_In). These inputs permit insertion of a programmable gain circuit between the Mux_Out and A/DC_In pins, to create a programmable gain A/D converter for six channels.

Desirably, the inputs of the MAX180 chip are filtered, for example by implementing a simple RC filter circuit with a cut-off frequency of 10 k$\Omega$×0.1 $\mu$F=1000 Hz, relative to the Nyquist limit for the target sample rate. The cut-off frequency can easily be made adjustable by replacing the 10 k$\Omega$ resistor network dip with one of a different value. In order to insure integrity of the digitized signal, bypass capacitors (PBC) were placed on all power supply pins of the MAX180. The conversion process was driven (Clocked) by a 1 Mhz TTL crystal clock oscillator (JEMCO Product No. OSC1H) with a by-pass capacitor on the power supply pin of the half can to limit noise in the rest of the system.

The A/D system communicated with the computer via a bi-directional parallel port which was implemented with a SIIG I/O Expander 3P™ (Model No. IO1814). One particular SIIG I/O expander had a slow rise time of 5 microseconds with no load, even though the fall time was more than an order-of-magnitude faster. The rise time may be improved by adding 5 kΩ pull-up resistors on the output-only lines of the parallel port to decrease the rise time to about 1 microsecond. This improvement may be beneficial at higher sample rates even though it is not necessary for a 2300 Hz scan rate used in one embodiment of the invention. For diagnostic purposes, the numerical values being sent to the parallel port may be optionally displayed on the outside of the electronics package by providing three HEX-character LED displays such as JEMCO Product No. TIL311. Such a display may be used to aid in debugging any communications problems with the computer that may arise during product development or reassembly, or in the event of component failure. Naturally, for high scanning rates (e.g. optimal 2000 Hz rate) the LED displays for the eight signal lines would be unintelligible to human eyes.

Desirably, the eight bi-directional parallel lines between the computer (microprocessor) and the MAX180 chip are protected by passing through a 10 kΩ resistor network. The resistor network insures that no electrical operating specifications would be exceeded if, for example due to programming error, both the computer and the MAX180 simultaneously attempt to drive the port lines. Unique electrical connectors for the power supply, parallel port lines, and sensor lines may desirably be provided to ensure correct setup and operation of the electronics components.

For applications requiring even faster data rates, the electronics may be implemented internal to a computer, for example to an ISA or PCI card such that the A/D data is communicated directly with the computer's bus and speed limitations imposed by the bi-directional parallel port are eliminated.

Of course, those workers having ordinary skill in the art will readily appreciate that a variety of conventional signal processing structures and methods may be applied to the inventive hand-sensing joint link devices 101, and that the devices describe above is only particular implementation, and that the invention is not restricted to such implementation.

In FIG. 8B, using a Wheatstone bridge circuit, the two variable-resistance strainsensing elements 813 and 814 produce a voltage 824 relative to a voltage 825, produced by the voltage divider circuit made up from fixed resistors 815. The voltage difference is filtered by the analog filter 816 and then amplified differentially by the instrumentation amplifier 817. Acceptable values for an analog R-C filter are R=10,000 ohm, and C=0.1 $\mu$F, although many other suitable values may be used. Any suitable instrumentation amplifier may be used, such as an Analog Devices AD624. The amplified filtered output 818 is then digitized by the analog-to-digital (A/D) converter 819. Any suitable A/D may be used, such as a Maxim MAX180 or MAX181. The digitized data 820 is input into a computer 821. The computer uses knowledge of the kinematic structure of the hand-sensing joint-link device and converts the joint angle data into hand-position data (See discussion below and Appendix I for software program listing). The hand position data is optionally converted by a computer program into a signal 822 that produces a graphical image of the hand 823 on a computer monitor 824. A commercial computer program capable of converting hand position data into such a signal 822 is the VirtualHand® Toolkit Library, by Virtual Technologies, Inc., Palo Alto, Calif.

As may be clearly seen, a hand-sensing joint-link device 102, 103 of the type shown may be provided for either a single arm of the user or operator, or may be used with each separate arm of the user or operator such that little or no interference between the two arms or linkage assemblies occurs. Arm gestures, such as the well known basketball "traveling penalty" gesture, can be performed without mechanical interference between the two arms or devices. Furthermore, the provision of the Hall-effect sensor devices and wired connection back to the electronics, provides position and orientational detection means which does not suffer the disadvantageous effects of the electromagnetic fields associated with conventional devices, such as adverse effects on monitor display quality; nor do they require direct line of sight as do conventional ultrasonic or infrared based devices. The structure of the hand-sensing joint-link device 102, 103 also advantageously results in the majority of the load, and large forces, being placed on the user's forearm, rather than on the user's hand. The hand-sensing joint-link device may also be used in conjunction with a computer interface such as a mouse, or other pointing device, and a keyboard, because the structure is generally disposed at the outer periphery of the user's arm and hand and to the extent that it is disposed adjacent the hand it is disposed on the top or back side of the hand as a user would type or otherwise manipulate controls. The user is also free to move the hand in any plane and perform any of the normal rotations, as well as grasp objects and the like.

The general configuration of various embodiments of the hand-sensing joint-link device including the connectivity and operation of the joints and links, having now been described, we now turn our attention to a description of exemplary embodiments of the joints (for example, joint 117) and sensor assembly (for example, sensor assembly 500) which connect the links (for example, link 134) and provide position and angular orientational information about the relative positions and orientations of the links.

We now describe the structure of an exemplary embodiment of a sensor assembly 500 which includes a permanent magnet 501 having a cylindrical shape, and a Hall-effect element 503 disposed in functional proximity to the magnet. Functional proximity may generally mean proximity that is close enough for the Hall-effect element to intercept magnetic flux from the magnet and produce a useable output signal as a function of all joint angles of interest, typically within a 180 degree range. An exemplary theoretical graphical plot of sensor angle versus sensor output signal is provided in FIG. 9. In this graph, the usefull, unambiguous range is from 90 degrees to 270 degress as the orientation is described in FIG. 1. The Hall-Effect sensor detects the magnitude and direction of the magnetic field, and the ploted voltage reflects a 2.5 volt D.C. applied bias so that the entire output is positive and the zero-crossing with the change in magnetic field polarity occurs at the 2.5 volt signal level.

The cylindrically-shaped magnet includes magnetic north and south poles at opposed ends of the cylinder. As is well known, lines of magnetic flux extend between the north and south poles of magnet 51 so as to form closed loops. The physical phenomenon of a Hall-effect device is well known and not described in detail here. Basically, the electrical signal output for example expressed in volts, is dependent upon the magnetic field passing through the Hall-effect element. The inventive sensor assembly 500 indicates orientation of the first and second links associated with a joint by providing the magnet 501 in one of the first or second links, and the Hall-effect sensor element 503 in the other of the two links. Orientation of the joint (or joint angle) is sensed by sensing the Hall-effect element output voltage and correlating that with a theoretical sensor output versus sensor angle characteristic curve or calibration table, from which the joint orientation may readily be determined. In the inventive structure, the sensor assembly is very small, the combination of the magnet 501 and Hall-effect element 503 being less than about 1 cm in length. The sensor assembly 500 produces an output which is a function of joint angle, where in general the angle varies between through a 180 degree range, about 90° and 270° as the angles are defined in the diagram, and depends upon the amount of magnetic flux flowing through the Hall-effect element. In the inventive structure, the distance between the Hall-effect element 503 and the permanent magnet 501 remains constant. However, to the extent that it would be desirable or necessary that the distance between the magnet and Hall-effect sensor were to change, or that some distance change resulted from manufacturing tolerances or the like, such change in distance could be accommodated by additional calibration curves, look-up tables, and the like, so long as the orientation angle could be unambiguously determined from the sensor output signal.

Figure 9:
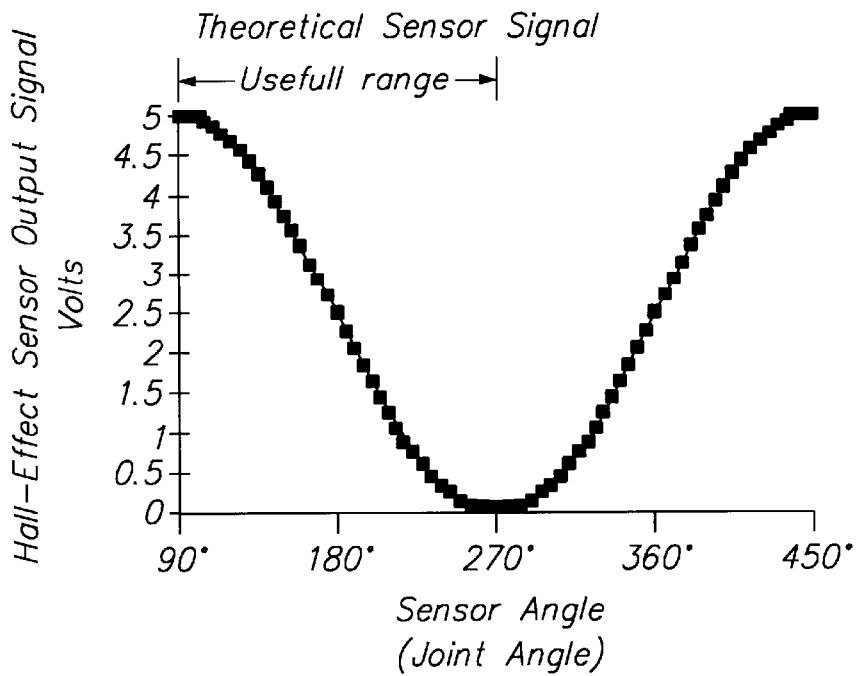
FIG. 9 shows an illustration of the output of an exemplary sensor assembly as a function of sensor angle.

An exemplary Hall-effect sensor output voltage versus sensor angle relative to the magnetic field is shown in FIG. 9, and can be seen to have a generally sinusoidal shape. It can be seen that although the function is nonlinear, the relationship is smoothly varying and for example a look-up table (LUT) may be used to determine very accurately the joint orientation as a function of sensor output. In the exemplary embodiment a 12-bit A/D converter was found to provide sufficient angular resolution for the sensor assembly 500. Of course, applications not requiring as high of an accuracy may use an A/D converter having fewer bits, and applications requiring greater accuracy may use additional bits for the A/D converter.

Because the Hall-effect sensors measure the strength and direction of magnetic flux, where multiple sensor assemblies are provided in a single joint, for example to provide the bending and twisting movements, the two magnets 501 are located in fixed positions and orientations relative to each other within the joint assembly so that there is no interference or ghosting from the magnet 501 in one sensor assembly to the Hall-effect device 503 in the other sensor assembly as the result of movement of the joint. In other words the joints are designed so that the permanent magnets 501 are fixed relative to each other, and as a result of this fixed magnet positioning, the only effect of moving a joint is the change in magnetic flux through the Hall-effect device as a result of angular change.

The nature of this fixed relationship and the position of the permanent magnets 501 and Hall-effect elements 503 will be described in greater detail relative to the description of the joints.

The links are built out of a light weight, stiff material, for example hollow carbon fiber tubing which provides a light weight and great strength and stiffness. The joints may be machined from Delrin and aluminum components as these materials provide light weight as well as low friction. Of course, other suitable joint materials may be used. Wires from the sensor assemblies 500 may be run external to the links or more desirably within the hollow interior of the links to the electronics via one or more connectors. In the embodiment illustrated and described relative to FIG. 1, the hand-sensing joint-link assembly 102 includes bending type joints, and twisting type joints. In an exemplary embodiment based on the diagram in FIG. 1, joints 120, 124, and 128 are bending joints, and joints 118, 122, 126, and 133 are twisting joints. Joint 117 may be a twisting joint (i.e., joints 117 and 133 are collectively called a "wrist joint") or a bend joint. If joint 117 were a twist joint, link 116 would typically include a 90 degree bend to meet the necessary orientation of the twist joint. In the case where the link-joint structure of FIGS. 1A and 1B are used, and where joints 117 and 133 make up a wrist joint as provided in FIG. 12, and where joints 120, 124 and 128 are bending joints as provided in FIG. 10, and where joints 118, 122 and 126 are twist joints as provided in FIG. 11, the Hall-Effect sensor outputs will be unique, that is, no joint will rotate more that 180 degrees in typical operation.

Exemplary structures for bending, twisting, wrist, and combination joints are now described as an aid to understanding the particular embodiment of the invention, however, it should be understood that other means for articulating two links about a point are known and that such means may be used for the inventive device.

Figure 10:
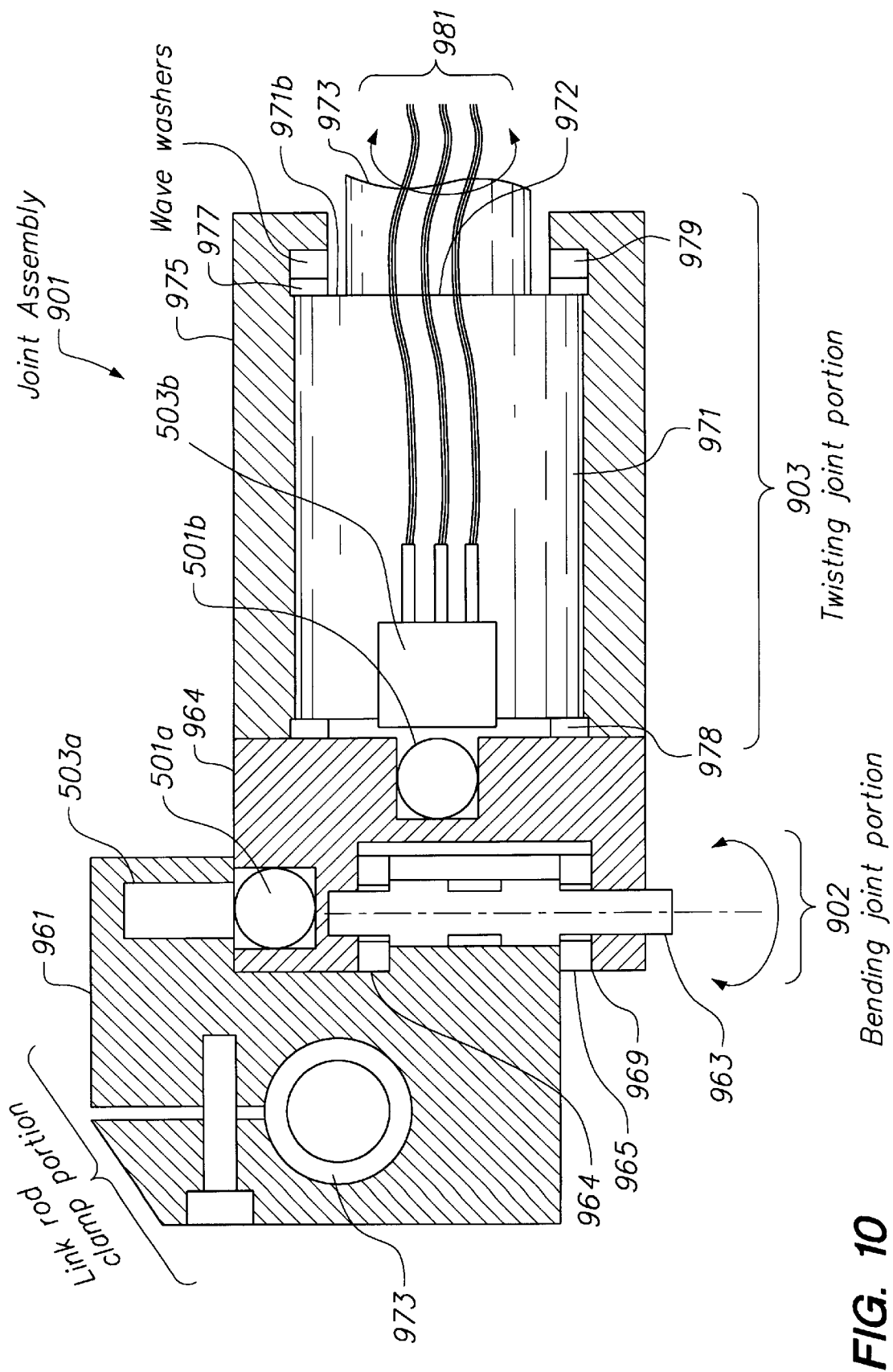
FIG. 10 shows an exemplary embodiment of a portion of the hinge joint.

With reference to FIG. 10 there is shown one embodiment of a bending type joint 902 in combination with a twisting type joint 903. The exemplary bending type joints each include hinge (first) 961 and link-mounting (second) 962 portions which are joined pivotally by a pin 963, desirably made of brass or other suitable bearing material. Brass pin 963 rides in a pair of low friction bushings 964, 965 which are interposed between hinge first portion 961 and hinge second portion 962. These low friction bushings may be made of for example brass, Teflon, Delrin, or other low friction materials commonly known in the mechanical arts as providing good wear characteristics and low friction movement for a hinge type application. A hollow link rod 973 is also shown clampled with a screw or other fastener to the second portion 962. A wave spring washer 969, such as is available from Olander Company of Sunnyvale, Calif., may be used to provide a constant or relatively constant force between the first and second portions 961, 962 so as to reduce any inaccuracies in the joint that might otherwise arise due to mechanical slop or free play within the joint.

The exemplary hinge illustrated in FIG. 10 also shows the locations of magnets 501a, and 501b, (the designations a, b, c, and d with respect to the magnets and sensors refers to different instances of the structure within the same figure) within the second component of the hinge 962. In this sectional view they appear as circular objects. One Hall-effect element sensor 503a is also visible in the illustration and it is clear that as component 962 rotates about the axis of brass pin 963 the orientation of magnet 501a relative to Hall-effect element 503a will change, thereby altering the magnetic flux through the Hall-effect element, and changing its output voltage signal as already described. The structure and operation of the twisting component of the joint assembly 901 is described in greater detail relative to the structure in FIG. 11.

Figure 11:
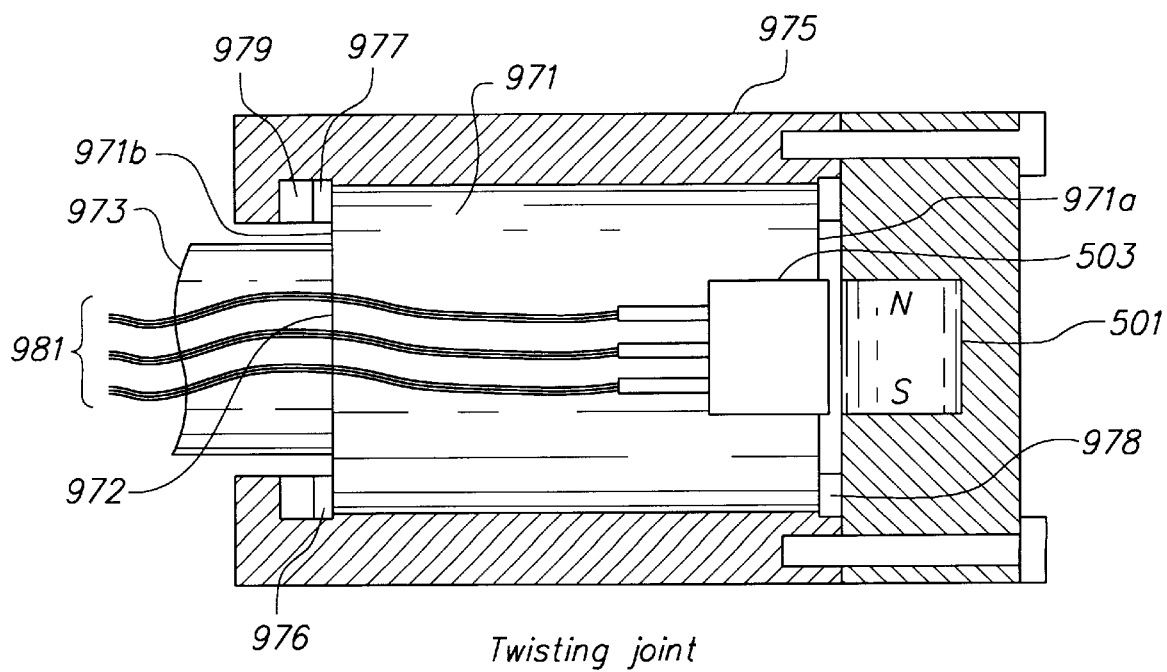
FIG. 11 shows an exemplary embodiment of a portion of the wrist joint showing the manner in which magnets associated with different Hall-effect sensor assemblies are fixedly positioned relative to each other so that movement of components of the joint does not alter the magnets' contribution to the intercepted flux by one or the other of the Hall-effect sensors.

We now describe the structure and operation of the twisting joints relative to the illustration in FIG. 11. A machined Delrin core 971 is connected to carbon fiber shaft 973 with an epoxy adhesive 972. Of course other materials other than Delrin and carbon fiber shafting may be used, and types of adhesives may be used or the shaft may be fastened to the Delrin core by other known fastening means. For example, mating portions of the shaft and Delrin core may be provided with mating screw threads, set screws may be used to attach them, when appropriate metal materials are substituted for the carbon fiber or Delrin, the sections may be welded together or otherwise fused. Alternatively with suitable selection of materials, the shaft and core 971, 973 may be integrally formed by a common material.

With further reference to FIG. 11, core 971 is held captive within a housing 975 having a mating cylindrical bore for receiving core 971 and allowing rotation of the core relative to housing bore 976 so as to provide the desired twisting rotation. The housing 975 in the exemplary embodiment is fabricated from aluminum, and also includes other structural features as shown to connect the portion of the housing capturing core 971 with other elements of the joint which may alternatively provide a second twisting type joint component or a bending type joint component. For example, the twisting type joint may be combined with the bneding type joint to provide the structure already shown and described relative to FIG. 10. Other twisting joints may provide only a single twisting type movement.

In these joints, core 971 acts as a rotatable piston within housing 975, and the core is desirably machined to a fine tolerance relative to the housing so as to provide an accurate and precise fit that has low friction and that appropriately limits any wobble of the core within the housing bore 976. Advantageously, Teflon washers 977, 978 are provided at each end of core 971 to reduce friction between opposing ends of core 971 (971*a*, 971*b*) against the housing 975. Desirably a wave spring washer 979 is provided at one end of the housing bore 976 to preload the joint to remove unwanted motion due to excessive tolerance of the core 971 within the housing bore 976. Grease, oil, or other lubricant 980 may also be provided within the joint to provide reduced friction of the core relative to the housing.

With further reference to FIG. 11, we note that Hall-effect element 503 is provided within a recess in core 971 at a first end 971*a* of the core so that it is located adjacent to permanent magnet 501 within the aluminum housing. As core 971 rotates with shaft 973, the Hall-effect sensor rotates relative to magnet 501 and the output signal, such as a signal provided on sensor element wires 981, varies with the rotational orientation. In the exemplary embodiment illustrated in FIG. 11, the Hall-effect sensor is disposed within a machined recess in core 971. While the Hall-effect sensor 503 is shown protruding slightly from the Delrin core 971, such protrusion is not necessary, it only being necessary that the sensor element be located sufficiently close to the magnet so that the Hall-effect sensor experiences a sufficient magnetic flux to generate adequate voltage, and that the differences in the magnetic flux as a function of rotational angle be readily discernible by the sensor signal processing electronics, that is that the differences be distinguishable from any noise present in the system (sufficiently high signal to noise ratio), and within the operational range of the A/D converter.

When sensors other than the Hall-Effect sensor are used, the joint may be modified to accommodate the physical and optical, electrical, magnetic, or other sensing phenomenon required to detect articulation of the joint. Furthermore, while the link rod 973 is shown disposed off the axis of the hinge pin 963, alternative structures may be disposed to provide an one axis placement if desired.

The functional feature of the aluminum housing 975 is that it provides the requisite bore for the mating Delrin core, and hold the permanent magnet 501 proximate the Hall sensor 503, and further that it provide sufficient structure for connecting the core/shaft assembly to the next member of the linkage whether that be a twisting-type member or bending-type member.

Figure 12:
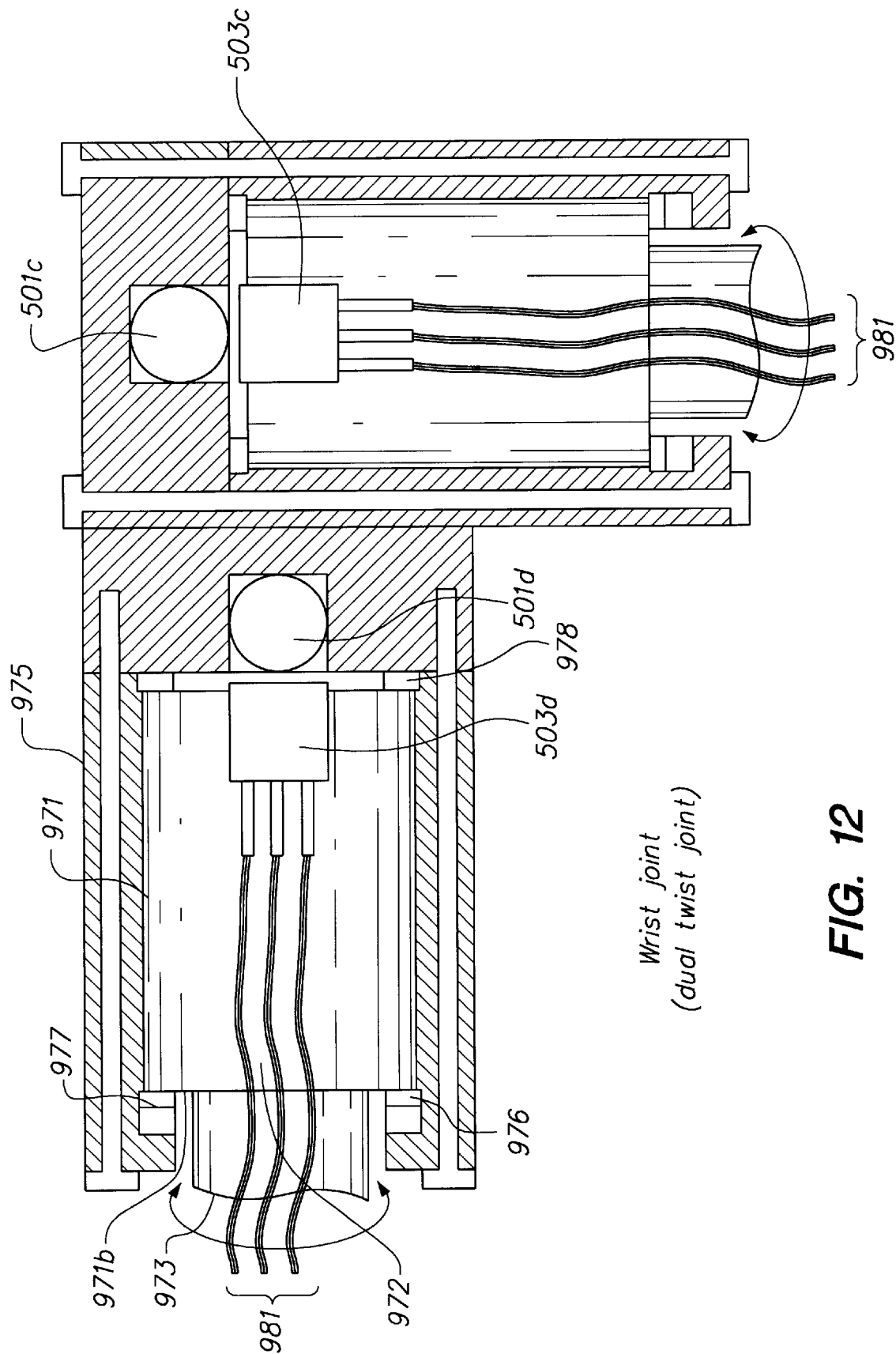
FIG. 12 shows an exemplary embodiment of a twist joint.

An alternative physical design for a dual twisting joint that may advantageously be used as a wrist joint is illustrated in FIG. 12. It is noted that the structure in FIG. 12 is similar to the structure in FIG. 11 except that the two magnets 501*c* and 501*d* are viewed from a different direction that illustrated in FIG. 11 so they appear as round circles rather than as rectangular projections of the cylinder and the housing structure 975 is adapted to provide the twisting type motion appropriate to simulate or follow wrist movements and for a different connection to other structural elements in the device. The manner in which the two magnets 501*c* and 501*d* are fixed relative to each other so as to avoid ghosting, or other changes in magnetic cross-coupling, is also readily apparent from the structure. Separate sensor elements 503*c* and 503*d* are disposed proximate magnets 501*c* and 501*d* respectively.

While software for computing x, y, z, roll, pitch, and yaw from raw sensor angular data are within the ordinary skill or workers in the art, operational software is now summarized and out of an abundance of caution, a listing of exemplary software is provided in Appendix I. The output of Hall-Effect sensor assemblies 500 while repeatable is not linear; therefore, a calibration for each sensor is desirable. While some form of polynomial calibration expression may be generated to calibrate the output for each sensor, a computationally faster manner of providing the calibration uses a comprehensive look-up-table to correlate the sensor voltage with a joint angle, position, or orientation. At the beginning of program execution, the software program loads up eight arrays (one array for each sensor) with linear interpolation between given predetermined calibration points. When a value (in the range between 0 and 4095) for a sensor is read from the parallel port, the corresponding calibrated reading is found by referring to that memory location in the calibration array. The sensors are read in accordance with operation of the signal processing electronics, for example the MAX180 chip, using timing particular to the device. After the sensor readings are calibrated to give the joint angles, the joint angles are fed into transformation routines to generate six numbers or values (x, y, z, pitch, roll, yaw) that describe the hand's six-space location. The location is communicated over the serial port using a predetermined protocol, such as the Polhemus Fastrak® position sensor protocol.

The foregoing description, for purposes of explanation, used specific nomenclature to provide a thorough understanding of the invention. However, it will be apparent to one skilled in the art that the specific details are not required in order to practice the invention. In other instances, well known structures and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Therefore, while the invention has been described with reference to specific embodiments, the description is illustrative of the invention and is not to be construed as limiting the invention. Thus, various modifications and amplifications may occur to those skilled in the art without departing from the true spirit and scope of the invention as defined by the appended claims.

All publications and patent applications mentioned in this specification are herein incorporated by reference to the same extent as if each individual publication or patent application was specifically and individually indicated to be incorporated by reference.

APPENDIX I

```c
#include <stdio.h>
include <conio.h> define  rad  (3.1415926535/180.0)  /* Number of radians in a degree*/

/* --------- DEFINES -------------- */
#define COM1    0x3F8
#define COM2    0x2F8
#define COM3    0x3E8
#define COM4    0x2E8
#define BAUD    3       /* 9600 baud */
#define LCR_VCL 7       /* no parity, 8 bits, 1 stop bit */

/* ------------PROTOTYPES --------------- */
void UART_init (unsigned) ;
void UART_send (unsigned, unsigned char) ;
unsigned UART_receive (unsigned) ;

/* --------------------------------------- */
void UART_init (unsigned BA)
{
    outp (BA+3, 0x80) ;
    outpw (BA, BAUD) ;
    outp (BA+3, LCR_VCL) ;
    outp (BA+4, 0) ;
}

/* --------------------------------------- */
void UART_send (unsigned ba, unsigned char c)
{
    while ((inp(ba+5)&0x20) == 0)
        ;
    outp (ba, (int) c) ;
}
void send_Float (long) ;
void send_Float(long f)
{
    unsigned char *c;
    c = &f;
    UART_send(COM1,c[0]);
    UART_send(COM1,c[1]);
    UART_send(COM1,c[2]);
    UART_send(COM1,c[3]);
} void sendPolhemus(float xyz[3], float rpy[3])
{
    long a ;
    a = (long)(xyz[2] * 10000) ;
    send_Float(a);
    a = (long)(-xyz[1] * 10000) ;
    send_Float(a);
    a = (long)(xyz[0] * 10000) ;
    send_Float(a);
    a = (long)(rpy[0]/rad * 10000) ; /*yaw*/
    send_Float(a);
    a = (long)(rpy[1]/rad * 10000) ;
    send_Float(a);
    a = (long)((rpy[2]/rad) * 10000) ;
    send_Float(a);
    UART_send(COM1,0x0d);
```

Forearm Supported Exoskeleton Hand-Tracking Device
Appendix I - Sheet 1 of 17 sheets

A-65058/BIR/RMA

APPENDIX I

```c
    UART_send(COM1,0x0a);
} void sendstr(char *buf)
{
    while(*buf) {
        UART_send(COM1,*buf++);
    }
}
/* --------------------------------------- */
unsigned UART_receive (unsigned ba)
{
    unsigned x ;

x = ( inp(ba+5) & 0x9F) << 8 ;
    if (x & 0x100)
        x |= ( (unsigned)inp (ba) ) & 0xFF ;
    return x ;
}

/*************************************************************************
                readport.c Read bi-directional port
by Joe Wagner
Written December 8, 1995
Last revised December 9, 1995

This program sets up a bidirectional parallel port on a PC to read
    and write to that port.
*************************************************************************/ include <stdio.h>
include <stdlib.h>
#include <malloc.h>
#include <conio.h>
#include "vt_math.h"

# define  BASE_ADD      0x278         /* Base address of the LPT port */
# define  STATUS_IN     BASE_ADD+1    /* Status bits in from periferal (per.)*/
# define  CONTROL_OUT   BASE_ADD+2    /* Control Address*/
# define  DATA_OUT      BASE_ADD      /* Location of 8 data lines*/
# define  DATA_IN       DATA_OUT      /* Location of 8 data lines*/
# define  EN_OUTPUT     0xdf          /* C5 Output enabled (=0) */
# define  EN_INPUT      0xff          /* C5 Input enabled (=1) */
# define  DIS_WRITE     0xfe          /* C0 (Strobe) (inv) gives for data to peri.*/
# define  DIS_READ      0xfd          /* C1 (Autofd) (inv) asks for data for peri.*/
# define  EN_CS         0xfb          /* C2 (Init) gives chip select to per.*/
# define  EN_HBEN       0xf7          /* C3 (SelctIn) (inv) asks High Bit from per.*/
# define  BUSY          0x80          /* S7 (Busy) High = per. is busy */
define  CLOCK         0x20          /* S5 (PaperEnd) externally generated clock*/ define  RISE_TIME     500           /*Time to let slow port rise (50= five uSec) */ define  NUM_CHAN      8             /* Number of A/D Channels to be read */
define  NUM_CALIB     4096          /* Number of array values for calibration array
                                         Note that it's huge for speed*/ void Init_Calib( void );              /* Initialize calibration array, possibly have
                                         user go to know position...(?)*/
void Write_Data( int channel );       /* Write data to port, selecting A/D channel */
```

APPENDIX I

```c
int Read_Data( void );                          /* Read 12 bit data (indata) from port */
void convert_record (float angles[NUM_CHAN], float xyz[3], float ypr[3]);

float raw2angle(int raw, int chan) ;
float far *calib[NUM_CHAN];
                                                /*Calibration array to convert raw data
                                                  of raw[] into link[] */
/* ---------------------------------------------------------------- */
/* ---------------------------------------------------------------- */
void main(void)
{
    char buf[400];
    int  i,                                     /*Temp Variables*/
         indata,                                /*Temp variable holding incoming raw data*/
         channel,                               /*What channel are we looking at*/
         raw[NUM_CHAN];                         /*Holds raw array values*/ float link[NUM_CHAN];                       /*Calibrated linkage angles (in radians)*/
    float xyz[3], rpy[3];
    printf(" Hello World !\n");
    Init_Calib();
    UART_init (COM1) ;
    printf ("back from init\n") ;

/*  for(li=0;li<30000000;li++);
printf("end loop");    */
    while (!kbhit())
    {
        for(i=0;i<NUM_CHAN;i++)
        {
            Write_Data(i);
            raw[i]=Read_Data();
            link[i]=raw2angle(raw[i],i);
        }
        if (UART_receive(COM1)) {
          convert_record(link,xyz,rpy);
          /* gotoxy (5,9) ; */

/*printf("%4.0f %4.0f %4.0f  %6.1f %6.1f %6.1f ||",
             xyz[0],xyz[1],xyz[2],rpy[0]/rad,rpy[1]/rad,rpy[2]/rad);
           */
          /*sendstr(buf);*/
          printf ("%3x %3x %3x %3x %3x %3x %3x %3x ||",
              raw[0], raw[1], raw[2], raw[3],
              raw[4], raw[5], raw[6], raw[7]) ;
          /*sendstr(buf);    */ printf ("%4.0f %4.0f %4.0f %4.0f %4.0f %4.0f %4.0f %4.0f\n\r",
              link[0]/rad, link[1]/rad, link[2]/rad, link[3]/rad,
              link[4]/rad, link[5]/rad, link[6]/rad, link[7]/rad) ;
       /* sendstr(buf);*/
          sendPolhemus(xyz,rpy);
        }
    }
}  /*End Main*/

/* raw2angle */
/* mark yim */
/* 2:27am 12/14/95 */
float
raw2angle(int raw, int chan)
{
    return(calib[chan][raw]);
```

APPENDIX I

```
/* convert_record */
/* mark Yim */
/* 1:00 am 12/14/95 */ void
convert_record (float angles[NUM_CHAN], float xyz[3], float ypr[3])
{
    matrix4x4 A;
    pos3d pnt;

vt_rot_matrix (angles[0], 'y', A);
    /* trans 0.85 0 0 */
    vt_mult_rot_matrix(angles[1], 'z', Premult, A);
    pnt[0] = 0.0; pnt[1] = 0.0; pnt[2] = 33.8;
    vt_mult_trans_matrix(pnt, Premult, A);
    vt_mult_rot_matrix (angles[2]+90.0/rad, 'y', Premult, A);
    /* trans 0.85 0 0 */
    vt_mult_rot_matrix(angles[3], 'z', Premult, A);
    pnt[0] = 0.0; pnt[1] = 0.0; pnt[2] = 61.7;
    vt_mult_trans_matrix(pnt, Premult, A);
    vt_mult_rot_matrix (angles[4]+90.0/rad, 'y', Premult, A);
    /* trans 0.85 0 0 */
    vt_mult_rot_matrix(angles[5], 'z', Premult, A);
    pnt[0] = 0.0; pnt[1] = 0.0; pnt[2] = 29.5;
    vt_mult_trans_matrix(pnt, Premult, A);
    vt_mult_rot_matrix(-90.0/rad, 'y', Premult, A);
    pnt[0] = 0.0; pnt[1] = 0.0; pnt[2] = 6.5;
    vt_mult_trans_matrix(pnt, Premult, A);
    vt_mult_rot_matrix(angles[6], 'z', Premult, A);
    vt_mult_rot_matrix(angles[7], 'y', Premult, A);
    xyz[0] = A[3][0];
    xyz[1] = A[3][1];
    xyz[2] = A[3][2];
    vt_matrix_to_euler_angles(A, ypr);
}

/***************************************************************
            Write_Data
by Joe Wagner
Written December 8, 1995
Last revised December 9, 1995

Safely Setup the port to write data
***************************************************************/
void Write_Data( int channel )
{
    int i;
/* Set port to write data*/
    i=outp(CONTROL_OUT, EN_OUTPUT & EN_CS & DIS_READ);
/* Total Write pulse width must be >120 */
/* Write channel to data*/
    i=outp(DATA_OUT,channel);
/* Wait 80 ns for write data setup time*/
/* Set port back to tri-state and set CS and Write back to high*/
    for(i=0;i<RISE_TIME;i++);           /*Wait 5 uSec for slow port rise time*/
    i=outp(CONTROL_OUT, EN_INPUT & DIS_WRITE & DIS_READ);
    for(i=0;i<RISE_TIME;i++);           /*Wait 5 uSec for slow port rise time*/
    /*  printf("stop %x\n",i);    */
}
/***************************************************************
```

APPENDIX I

```
                Read_Data
by Joe Wagner
Written December 8, 1995
Last revised December 9, 1995

Safely Setup the port to write data
***************************************************************/
int Read_Data( void )
{
    unsigned int i,lowbyte,fulldata;
    /* ********** Insert check for busy signal ? ********** */

/* Set port to read first byte*/
    i=outp(CONTROL_OUT, EN_INPUT & EN_CS & DIS_WRITE);
        for(i=0;i<RISE_TIME;i++);    /*Wait 5 uSec for slow port rise time*/
/* Wait 100ns before reading data, (&12 clock cycles after write command) */
/* Read 8 LSB of data*/
    lowbyte=inp(DATA_IN);
        for(i=0;i<RISE_TIME;i++);    /*Wait 5 uSec for slow port rise time*/
/* Set read and chip-select back to high */
    i=outp(CONTROL_OUT, EN_INPUT & DIS_WRITE & DIS_READ);
    for(i=0;i<RISE_TIME;i++);        /*Wait 5 uSec for slow port rise time*/
/* Set HBEN (high bit enable) to high */
    i=outp(CONTROL_OUT, EN_INPUT & EN_HBEN & DIS_WRITE & DIS_READ);
/* Wait 80ns before sending read command*/
/* Set port to read second byte since HBEN had been set to high*/
    for(i=0;i<RISE_TIME;i++);        /*Wait 5 uSec for slow port rise time*/
    i=outp(CONTROL_OUT, EN_INPUT & EN_HBEN & EN_CS & DIS_WRITE);
/* Wait 100ns before reading data*/
/* Read 4 MSB of data located in the 4 LSB of byte*/
    for(i=0;i<RISE_TIME;i++);        /*Wait 1 uSec to ensure 100 nsec*/
    fulldata=inp(DATA_IN);
/* Set read and chip-select back to high, and HBEN to low */
    for(i=0;i<RISE_TIME;i++);        /*Wait 5 uSec for slow port rise time*/
    i=outp(CONTROL_OUT, EN_INPUT & DIS_WRITE & DIS_READ);
    for(i=0;i<RISE_TIME;i++);        /*Wait 5 uSec for slow port rise time*/
/*  printf("high:%x low:%x \n",fulldata,lowbyte);
*/  return((fulldata << 8) | lowbyte);
}

/******************************************************************
            Init_Calib
by Joe Wagner
Written December 8, 1995
Last revised December 9, 1995

Initializes calibration array, possibly have the user go to a
    predetermined position to double check sensors.
    The calib array holds the radian value in the array location
    corresponding to a NUM_CALIB (i.e. 12 bit) raw value. For example,
    if a sensor reading of 2001 corresponds to an angle of 45 degrees,
    the array element calib[2001] would hold 0.785398 e.g 45 deg. in
    radians. This whole shebang assumes memory access is faster than
    doing the math for each interpolation. A similar lookup table of
    the sin and cos for each calibration point might be considered
*****************************************************************/
void Init_Calib ( void )
{
    int    i,j,k;              /* Temp Counters */
    /* C[][][] holds the calibration points for sensors
    c[no. of sensor, calibration number (i.e. 0-12 for a max of 13),
    calibration data (e.g. 0=sensor reading, 1=_degree_ equivalence)]
```

APPENDIX I

```
    Note: that the conversion into radians will occur during the
    loading of calib[NUM_CHAN][NUM_CALIB] */
    float c[NUM_CHAN][5][2] ={
/*sensor #0, Note: Verify last Value>NUM_CALIB ! */
        { (0x5da,-45),(0x6e5,-20),(0x8b9,20),(0x9c9,45),(0x2000,180)},
/*sensor #1, Note: Verify last Value>NUM_CALIB ! */
        { (0x7f7,0),(0x900,20),(0x9a6,45),(0xafc,90),(0x20ff,180)},
/*sensor #2, Note: Verify last Value>NUM_CALIB ! */
        { (0x62b,45),(0x762,20),(0x99a,-20),(0xad9,-45),(0x20ff,-90)},
/*sensor #3, Note: Verify last Value>NUM_CALIB ! */
        { (0x709,-20),(0x800,0),(0x992,20),(0xac4,60),(0x20ff,180)},
/*sensor #4, Note: Verify last Value>NUM_CALIB ! */
        { (0x652,-45),(0x758,-20),(0x952,20),(0xa4b,45),(0x20f0,180)},
/*sensor #5, Note: Verify last Value>NUM_CALIB ! */
        { (0x5af,90),(0x744,20),(0x91c,-20),(0xb2d,-90),(0x20ff,-140)},
/*sensor #6, Note: Verify last Value>NUM_CALIB ! */
        { (0x5b2,45),(0x668,20),(0x8fc,-20),(0xa5c,-45),(0x20ff,-120)},
/*sensor #7, Note: Verify last Value>NUM_CALIB ! */
        { (0x4aa,-60),(0x58d,-20),(0x79a,20),(0xa28,60),(0x20ff,180)},
        };

printf (" Entering Init\n") ;
    for (i=0; i<NUM_CHAN; i++)
        calib[i] = (float far *) calloc(NUM_CALIB, sizeof(float)) ;

/*Fill Array*/
    for(i=0;i<NUM_CHAN;i++)
    {
        k=0;
        for(j=0;j<NUM_CALIB;j++)
        {
            if (c[i][k+1][0]<j) k++;
/*          c[i][k][0]=j-c[i][k][0];
            temp[0]=0;
            temp[0]= j -c[i][k][0];
            temp[0]= (j-c[i][k][0])
                    / (c[i][k+1][0]-c[i][k][0]);
            temp[0]=temp[0]*(c[i][k+1][1]-c[i][k][1]);
            temp[0]=temp[0]+c[i][k][1];
            temp[0]=temp[0]*rad;
*/
            calib[i][j] = rad *(
                                       (     (j-c[i][k][0])
                                        / (c[i][k+1][0]-c[i][k][0])
                                        )
                                     * (c[i][k+1][1]-c[i][k][1])
                                     + c[i][k][1]
                                     )    ;
        }
    }
    printf (" leaving Init\n") ;
}/* End Init_Calib*/

/*  FILE: vt_math3d.c  --  vector and matrix routines        */
/*                                                           */
/* ========================================================= */
/* -- Copyright (C) 1990,91,92,93 Virtual Technologies   -- */
/* -- Copyright (C) 1990,91,92 Larry Edwards             -- */
/* --                                                    -- */
/* --   Authors: Larry Edwards and William Chapin        -- */
/* ========================================================= */
```

APPENDIX I

```c
include <math.h> include "vt_math.h"
define M_PI   3.14159265353
#define M_PI_2 (M_PI/2.0)

matrix4x4 identity_matrix = {{1.0,0.0,0.0,0.0},
             {0.0,1.0,0.0,0.0},
             {0.0,0.0,1.0,0.0},
             {0.0,0.0,0.0,1.0}};

matrix4x4 zero_matrix = {{0.0,0.0,0.0,0.0},
             {0.0,0.0,0.0,0.0},
             {0.0,0.0,0.0,0.0},
             {0.0,0.0,0.0,0.0}};

float
vt_atan2(float x, float y)
{
  if (fabs(x) < epsilon)
    if (fabs(y) < epsilon)
      return(0.0);
    else if (y > 0.0)
      return (M_PI/2.0);
    else
      return (M_PI*1.5);
  else if (x < 0.0)
    return (atan(y/x)+M_PI);
  else
    return (atan(y/x));
} float
vt_coord_plane_dist(pos3d pnt, int plane_normal_axis)
{
  float hypot;

switch(plane_normal_axis)
  {
  case XAXIS: hypot = sqrt(pnt[PY]*pnt[PY]+pnt[PZ]*pnt[PZ]);
    break;
  case YAXIS: hypot = sqrt(pnt[PX]*pnt[PX]+pnt[PZ]*pnt[PZ]);
    break;
  case ZAXIS: hypot = sqrt(pnt[PX]*pnt[PX]+pnt[PY]*pnt[PY]);
    break;
  default: hypot = sqrt(pnt[PX]*pnt[PX]+pnt[PY]*pnt[PY]+pnt[PZ]*pnt[PZ]);
  } return(hypot);
}

/*-=-=-=-=-=-=-=-=-=-=-=-=-=-=-=-=-=-=-=-=-=-=-=-=-=-=-=-=-=-=-=-=*/
/*                      VECTOR MATH ROUTINES                      */
/*-=-=-=-=-=-=-=-=-=-=-=-=-=-=-=-=-=-=-=-=-=-=-=-=-=-=-=-=-=-=-=-=*/ void
vt_set_vec3(float u, float v, float w, vec3d result)
{
  result[VX] = u; result[VY] = v; result[VZ] = w;
} void
vt_copy_vec3(vec3d v1, vec3d v2)
{
```

APPENDIX I

```c
  v2[VX] = v1[VX];
  v2[VY] = v1[VY];
  v2[VZ] = v1[VZ];
} void
vt_vec_scale3(float s, vec3d v, vec3d result)
{
  result[VX] = s*v[VX]; result[VY] = s*v[VY]; result[VZ] = s*v[VZ];
} void
vt_vec_diff3(vec3d v1, vec3d v2, vec3d result)
{
  result[PX] = v2[PX] - v1[PX];
  result[PY] = v2[PY] - v1[PY];
  result[PZ] = v2[PZ] - v1[PZ];
}

/* NOTE: vec_sub3 subtracts does v1-v2 while above we do v2-v1 */ void
vt_vec_sub3(vec3d v1, vec3d v2, vec3d result)
{
  result[PX] = v1[PX] - v2[PX];
  result[PY] = v1[PY] - v2[PY];
  result[PZ] = v1[PZ] - v2[PZ];
} void
vt_vec_neg3(vec3d v1, vec3d result)
{
  result[PX] = -v1[PX];
  result[PY] = -v1[PY];
  result[PZ] = -v1[PZ];
} void
vt_vec_add3(vec3d v1, vec3d v2, vec3d result)
{
  result[PX] = v1[PX] + v2[PX];
  result[PY] = v1[PY] + v2[PY];
  result[PZ] = v1[PZ] + v2[PZ];
} void
vt_cross_prod3(vec3d v1, vec3d v2, vec3d v1Xv2)
{
  v1Xv2[VX] =   (v1[VY] * v2[VZ]) - (v1[VZ] * v2[VY]);
  v1Xv2[VY] = - ((v1[VX] * v2[VZ]) - (v1[VZ] * v2[VX]));
  v1Xv2[VZ] =   (v1[VX] * v2[VY]) - (v1[VY] * v2[VX]);
} float
vt_dot_prod3(vec3d v1, vec3d v2)
{
  return ((v1[VX] * v2[VX]) + (v1[VY] * v2[VY]) + (v1[VZ] * v2[VZ]));
} float
vt_vec_length3(vec3d v1)
{
  return (sqrt((v1[VX] * v1[VX]) + (v1[VY] * v1[VY]) + (v1[VZ] * v1[VZ])));
}
```

APPENDIX I

```
float
vt_distance3(vec3d pt1, vec3d pt2)
{
  vec3d vec;
  float length;
  ;
  vec[VX] = pt2[VX] - pt1[VX];
  vec[VY] = pt2[VY] - pt1[VY];
  vec[VZ] = pt2[VZ] - pt1[VZ];

length = sqrt((vec[VX]*vec[VX]) + (vec[VY]*vec[VY]) + (vec[VZ]*vec[VZ]));

return (length);
} void
vt_normalize3(vec3d v1, vec3d result)
   /* normalize a vector v1, put it in vect result */
{
  float length;
  ;
  length = sqrt((v1[VX] * v1[VX]) + (v1[VY] * v1[VY]) + (v1[VZ] * v1[VZ]));

if (length > 0.0)         /* just in case */
  {
    result[VX] = v1[VX] / length;
    result[VY] = v1[VY] / length;
    result[VZ] = v1[VZ] / length;
  }
}

/*-=-=-=-=-=-=-=-=-=-=-=-=-=-=-=-=-=-=-=-=-=-=-=-=-=-=-=-=-=-=-=-=-=*/
/*                       MATRIX MATH ROUTINES                       */
/*-=-=-=-=-=-=-=-=-=-=-=-=-=-=-=-=-=-=-=-=-=-=-=-=-=-=-=-=-=-=-=-=-=*/ void
vt_copy_matrix(matrix4x4 A, matrix4x4 B)
{
  B[0][0] = A[0][0];
  B[0][1] = A[0][1];
  B[0][2] = A[0][2];
  B[0][3] = A[0][3];

B[1][0] = A[1][0];
  B[1][1] = A[1][1];
  B[1][2] = A[1][2];
  B[1][3] = A[1][3];

B[2][0] = A[2][0];
  B[2][1] = A[2][1];
  B[2][2] = A[2][2];
  B[2][3] = A[2][3];

B[3][0] = A[3][0];
  B[3][1] = A[3][1];
  B[3][2] = A[3][2];
  B[3][3] = A[3][3];
} void
vt_identity_matrix_fill(matrix4x4 A)
```

APPENDIX I

```
{
  A[0][0] = 1.0;
  A[0][1] = 0.0;
  A[0][2] = 0.0;
  A[0][3] = 0.0;

A[1][0] = 0.0;
  A[1][1] = 1.0;
  A[1][2] = 0.0;
  A[1][3] = 0.0;

A[2][0] = 0.0;
  A[2][1] = 0.0;
  A[2][2] = 1.0;
  A[2][3] = 0.0;

A[3][0] = 0.0;
  A[3][1] = 0.0;
  A[3][2] = 0.0;
  A[3][3] = 1.0;
} void
vt_zero_matrix_fill(matrix4x4 A)
{
  A[0][0] = 0.0;
  A[0][1] = 0.0;
  A[0][2] = 0.0;
  A[0][3] = 0.0;

A[1][0] = 0.0;
  A[1][1] = 0.0;
  A[1][2] = 0.0;
  A[1][3] = 0.0;

A[2][0] = 0.0;
  A[2][1] = 0.0;
  A[2][2] = 0.0;
  A[2][3] = 0.0;

A[3][0] = 0.0;
  A[3][1] = 0.0;
  A[3][2] = 0.0;
  A[3][3] = 0.0;
} void
vt_rot_matrix(float theta, char axis, matrix4x4 A)
{               /* NOTE: theta is in radians */
  int i, j;
  float costh, sinth;
  ;
  A[0][0] = 0.0;
  A[0][1] = 0.0;
  A[0][2] = 0.0;
  A[0][3] = 0.0;

A[1][0] = 0.0;
  A[1][1] = 0.0;
  A[1][2] = 0.0;
  A[1][3] = 0.0;

A[2][0] = 0.0;
  A[2][1] = 0.0;
```

APPENDIX I

```
    A[2][2] = 0.0;
    A[2][3] = 0.0;                                                              //

A[3][0] = 0.0;
    A[3][1] = 0.0;
    A[3][2] = 0.0;
    A[3][3] = 1.0;

axis -= 'x';               /* WARNING: axis must be lowercase! */
    i = (axis+1) % 3;
    j = (axis+2) % 3;

costh = cos(theta);
    sinth = sin(theta);

A[i][i] = costh;
    A[i][j] = sinth;

A[j][i] = -sinth;
    A[j][j] = costh;

A[axis][axis] = 1.0;
} void
vt_trans_matrix(pos3d pnt, matrix4x4 A)
{
    A[0][0] = 1.0;
    A[0][1] = 0.0;
    A[0][2] = 0.0;
    A[0][3] = 0.0;

A[1][0] = 0.0;
    A[1][1] = 1.0;
    A[1][2] = 0.0;
    A[1][3] = 0.0;

A[2][0] = 0.0;
    A[2][1] = 0.0;
    A[2][2] = 1.0;
    A[2][3] = 0.0;

A[3][0] = pnt[PX];
    A[3][1] = pnt[PY];
    A[3][2] = pnt[PZ];
    A[3][3] = 1.0;
} void
vt_scale_matrix(vec3d scale, matrix4x4 A)
{
    A[0][0] = scale[PX];
    A[0][1] = 0.0;
    A[0][2] = 0.0;
    A[0][3] = 0.0;

A[1][0] = 0.0;
    A[1][1] = scale[PY];
    A[1][2] = 0.0;
    A[1][3] = 0.0;

A[2][0] = 0.0;
    A[2][1] = 0.0;
    A[2][2] = scale[PZ];
```

APPENDIX I

```
    A[2][3] = 0.0;

A[3][0] = 0.0;
    A[3][1] = 0.0;
    A[3][2] = 0.0;
    A[3][3] = 1.0;
} void
vt_axis_rot_matrix(vec3d rot_pt, vec3d rot_axis, float rot_angle,
            matrix4x4 rot_matrix)
{              /* NOTE: rot_angle is in radians */
  vec3d unit_axis;
  float sinth, versinth, costh;
  int i;

/* First, we translate origin to the center of rotation */
  for (i=0; i < 3; i++)
  {
    rot_matrix[3][i] = rot_pt[i];
    rot_matrix[i][3] = 0.0;
  }
  rot_matrix[3][3] = 1.0;

/* then we rotate */
  sinth = sin((double) rot_angle);
  costh = cos((double) rot_angle);
  versinth = 1.0 - costh;
  vt_normalize3(rot_axis,unit_axis);

rot_matrix[0][0] = unit_axis[VX]*unit_axis[VX]*versinth + costh;
  rot_matrix[0][1] = unit_axis[VX]*unit_axis[VY]*versinth - unit_axis[VZ]*sinth;
  rot_matrix[0][2] = unit_axis[VX]*unit_axis[VZ]*versinth + unit_axis[VY]*sinth;

rot_matrix[1][0] = unit_axis[VX]*unit_axis[VY]*versinth + unit_axis[VZ]*sinth;
  rot_matrix[1][1] = unit_axis[VY]*unit_axis[VY]*versinth + costh;
  rot_matrix[1][2] = unit_axis[VY]*unit_axis[VZ]*versinth - unit_axis[VX]*sinth;

rot_matrix[2][0] = unit_axis[VX]*unit_axis[VZ]*versinth - unit_axis[VY]*sinth;
  rot_matrix[2][1] = unit_axis[VY]*unit_axis[VZ]*versinth + unit_axis[VX]*sinth;
  rot_matrix[2][2] = unit_axis[VZ]*unit_axis[VZ]*versinth + costh;

/* finally we translate the origin to its new position */
  rot_matrix[3][0] = rot_matrix[0][0]*rot_pt[PX] + rot_matrix[1][0]*rot_pt[PY] +
                    rot_matrix[2][0]*rot_pt[PZ] + rot_matrix[3][0];
  rot_matrix[3][1] = rot_matrix[0][1]*rot_pt[PX] + rot_matrix[1][1]*rot_pt[PY] +
                    rot_matrix[2][1]*rot_pt[PZ] + rot_matrix[3][1];
  rot_matrix[3][2] = rot_matrix[0][2]*rot_pt[PX] + rot_matrix[1][2]*rot_pt[PY] +
                    rot_matrix[2][2]*rot_pt[PZ] + rot_matrix[3][2];
} void
vt_mult_matrix(matrix4x4 A, matrix4x4 B, matrix4x4 C)
{
  int i;
  matrix4x4 temp;

if (C == B)
  {
    vt_copy_matrix(B,temp);
    for (i=0; i < 4; i++)
    {
      C[i][0] = A[i][0]*temp[0][0] + A[i][1]*temp[1][0] +
```

APPENDIX I

```
            A[i][2]*temp[2][0] + A[i][3]*temp[3][0];

C[i][1] = A[i][0]*temp[0][1] + A[i][1]*temp[1][1] +
              A[i][2]*temp[2][1] + A[i][3]*temp[3][1];

C[i][2] = A[i][0]*temp[0][2] + A[i][1]*temp[1][2] +
              A[i][2]*temp[2][2] + A[i][3]*temp[3][2];

C[i][3] = A[i][0]*temp[0][3] + A[i][1]*temp[1][3] +
              A[i][2]*temp[2][3] + A[i][3]*temp[3][3];
  }
}
else if (C == A)
{
  vt_copy_matrix(A,temp);
  for (i=0; i < 4; i++)
  {
    C[i][0] = temp[i][0]*B[0][0] + temp[i][1]*B[1][0] +
              temp[i][2]*B[2][0] + temp[i][3]*B[3][0];

C[i][1] = temp[i][0]*B[0][1] + temp[i][1]*B[1][1] +
              temp[i][2]*B[2][1] + temp[i][3]*B[3][1];

C[i][2] = temp[i][0]*B[0][2] + temp[i][1]*B[1][2] +
              temp[i][2]*B[2][2] + temp[i][3]*B[3][2];

C[i][3] = temp[i][0]*B[0][3] + temp[i][1]*B[1][3] +
              temp[i][2]*B[2][3] + temp[i][3]*B[3][3];
  }
}
else
{
  for (i=0; i < 4; i++)
  {
    C[i][0] = A[i][0]*B[0][0] + A[i][1]*B[1][0] +
              A[i][2]*B[2][0] + A[i][3]*B[3][0];

C[i][1] = A[i][0]*B[0][1] + A[i][1]*B[1][1] +
              A[i][2]*B[2][1] + A[i][3]*B[3][1];

C[i][2] = A[i][0]*B[0][2] + A[i][1]*B[1][2] +
              A[i][2]*B[2][2] + A[i][3]*B[3][2];

C[i][3] = A[i][0]*B[0][3] + A[i][1]*B[1][3] +
              A[i][2]*B[2][3] + A[i][3]*B[3][3];
  }
}
} void
vt_mult_rot_matrix(float theta, char axis, int order, matrix4x4 A)
{              /* NOTE: theta is in radians */
  int axis1, axis2;
  float costh, sinth;
  vec4d temp;

axis -= 'x';              /* WARNING: axis must be lowercase! */ axis1 = (axis+1) % 3;
  axis2 = (axis+2) % 3;
  costh = cos(theta);
  sinth = sin(theta);

if (order == Premult)
```

APPENDIX I

```
{
  temp[0] = costh*A[axis1][axis] + sinth*A[axis2][axis];
  temp[1] = costh*A[axis1][axis1] + sinth*A[axis2][axis1];
  temp[2] = costh*A[axis1][axis2] + sinth*A[axis2][axis2];
  temp[3] = costh*A[axis1][3] + sinth*A[axis2][3];

A[axis2][axis] = -sinth*A[axis1][axis] + costh*A[axis2][axis];
  A[axis2][axis1] = -sinth*A[axis1][axis1] + costh*A[axis2][axis1];
  A[axis2][axis2] = -sinth*A[axis1][axis2] + costh*A[axis2][axis2];
  A[axis2][3] = -sinth*A[axis1][3] + costh*A[axis2][3];

A[axis1][axis] = temp[0];
  A[axis1][axis1] = temp[1];
  A[axis1][axis2] = temp[2];
  A[axis1][3] = temp[3];
}
else
{
  A[axis][axis1] = costh*A[axis][axis1] - sinth*A[axis][axis2];
  A[axis][axis2] = sinth*A[axis][axis1] + costh*A[axis][axis2];

A[axis1][axis1] = costh*A[axis1][axis1] - sinth*A[axis1][axis2];
  A[axis1][axis2] = sinth*A[axis1][axis1] + costh*A[axis1][axis2];

A[axis2][axis1] = costh*A[axis2][axis1] - sinth*A[axis2][axis2];
  A[axis2][axis2] = sinth*A[axis2][axis1] + costh*A[axis2][axis2];

A[3][axis1] = costh*A[3][axis1] - sinth*A[3][axis2];
  A[3][axis2] = sinth*A[3][axis1] + costh*A[3][axis2];
}
} void
vt_mult_trans_matrix(pos3d pnt, int order, matrix4x4 A)
{
  if (order == Premult)
  {
    A[3][0] = A[0][0]*pnt[PX] + A[1][0]*pnt[PY] + A[2][0]*pnt[PZ] + A[3][0];
    A[3][1] = A[0][1]*pnt[PX] + A[1][1]*pnt[PY] + A[2][1]*pnt[PZ] + A[3][1];
    A[3][2] = A[0][2]*pnt[PX] + A[1][2]*pnt[PY] + A[2][2]*pnt[PZ] + A[3][2];
    A[3][3] = A[0][3]*pnt[PX] + A[1][3]*pnt[PY] + A[2][3]*pnt[PZ] + A[3][3];
  }
  else
  {
    A[0][0] = A[0][0] + A[0][3]*pnt[PX];
    A[0][1] = A[0][1] + A[0][3]*pnt[PY];
    A[0][2] = A[0][2] + A[0][3]*pnt[PZ];

A[1][0] = A[1][0] + A[1][3]*pnt[PX];
    A[1][1] = A[1][1] + A[1][3]*pnt[PY];
    A[1][2] = A[1][2] + A[1][3]*pnt[PZ];

A[2][0] = A[2][0] + A[2][3]*pnt[PX];
    A[2][1] = A[2][1] + A[2][3]*pnt[PY];
    A[2][2] = A[2][2] + A[2][3]*pnt[PZ];

A[3][0] = A[3][0] + A[3][3]*pnt[PX];
    A[3][1] = A[3][1] + A[3][3]*pnt[PY];
    A[3][2] = A[3][2] + A[3][3]*pnt[PZ];
  }
} void
vt_mult_scale_matrix(vec3d scale, int order, matrix4x4 A)
```

APPENDIX I

```
{
  if (order == Premult)
  {
    A[0][0] = A[0][0]*scale[PX];
    A[0][1] = A[0][1]*scale[PX];
    A[0][2] = A[0][2]*scale[PX];
    A[0][3] = A[0][3]*scale[PX];

A[1][0] = A[1][0]*scale[PY];
    A[1][1] = A[1][1]*scale[PY];
    A[1][2] = A[1][2]*scale[PY];
    A[1][3] = A[1][3]*scale[PY];

A[2][0] = A[2][0]*scale[PZ];
    A[2][1] = A[2][1]*scale[PZ];
    A[2][2] = A[2][2]*scale[PZ];
    A[2][3] = A[2][3]*scale[PZ];
  }
  else
  {
    A[0][0] = A[0][0]*scale[PX];
    A[0][1] = A[0][1]*scale[PY];
    A[0][2] = A[0][2]*scale[PZ];

A[1][0] = A[1][0]*scale[PX];
    A[1][1] = A[1][1]*scale[PY];
    A[1][2] = A[1][2]*scale[PZ];

A[2][0] = A[2][0]*scale[PX];
    A[2][1] = A[2][1]*scale[PY];
    A[2][2] = A[2][2]*scale[PZ];

A[3][0] = A[3][0]*scale[PX];
    A[3][1] = A[3][1]*scale[PY];
    A[3][2] = A[3][2]*scale[PZ];
  }
} void
vt_transform3(pos3d pt, matrix4x4 A, pos3d xformedpt)
{
  float temp[3];

/* NOTE: this assumes A is not a perspective transformation  */
  /* NOTE 2: this assumes pt is a row vector multiplying A on the */
  /*         left!                                                */ if (xformedpt != pt)
  {
    xformedpt[0] = pt[0]*A[0][0] + pt[1]*A[1][0] + pt[2]*A[2][0] + A[3][0];
    xformedpt[1] = pt[0]*A[0][1] + pt[1]*A[1][1] + pt[2]*A[2][1] + A[3][1];
    xformedpt[2] = pt[0]*A[0][2] + pt[1]*A[1][2] + pt[2]*A[2][2] + A[3][2];
  }
  else
  {
    temp[0] = pt[0]*A[0][0] + pt[1]*A[1][0] + pt[2]*A[2][0] + A[3][0];
    temp[1] = pt[0]*A[0][1] + pt[1]*A[1][1] + pt[2]*A[2][1] + A[3][1];
    temp[2] = pt[0]*A[0][2] + pt[1]*A[1][2] + pt[2]*A[2][2] + A[3][2];

xformedpt[0] = temp[0];
    xformedpt[1] = temp[1];
    xformedpt[2] = temp[2];
  }
}
```

APPENDIX I

```c
void
vt_transform4(pos4d pt, matrix4x4 A, pos4d xformedpt)
{
  float temp[4];

/* NOTE: this assumes pt is a row vector multiplying A on the */
  /*       left!                                                */ if (xformedpt != pt)
  {
    xformedpt[0] = pt[0]*A[0][0] + pt[1]*A[1][0] + pt[2]*A[2][0] + pt[3]*A[3][0];
    xformedpt[1] = pt[0]*A[0][1] + pt[1]*A[1][1] + pt[2]*A[2][1] + pt[3]*A[3][1];
    xformedpt[2] = pt[0]*A[0][2] + pt[1]*A[1][2] + pt[2]*A[2][2] + pt[3]*A[3][2];
    xformedpt[3] = pt[0]*A[0][3] + pt[1]*A[1][3] + pt[2]*A[2][3] + pt[3]*A[3][3];
  }
  else
  {
    temp[0] = pt[0]*A[0][0] + pt[1]*A[1][0] + pt[2]*A[2][0] + pt[3]*A[3][0];
    temp[1] = pt[0]*A[0][1] + pt[1]*A[1][1] + pt[2]*A[2][1] + pt[3]*A[3][1];
    temp[2] = pt[0]*A[0][2] + pt[1]*A[1][2] + pt[2]*A[2][2] + pt[3]*A[3][2];
    temp[3] = pt[0]*A[0][3] + pt[1]*A[1][3] + pt[2]*A[2][3] + pt[3]*A[3][3];

xformedpt[0] = temp[0];
    xformedpt[1] = temp[1];
    xformedpt[2] = temp[2];
    xformedpt[3] = temp[3];
  }
} void
vt_transform34(pos3d pt, matrix4x4 A, pos4d xformedpt)
{
  /* NOTE: this assumes pt is a row vector multiplying A on the */
  /*       left!                                                */
  xformedpt[0] = pt[0]*A[0][0] + pt[1]*A[1][0] + pt[2]*A[2][0] + A[3][0];
  xformedpt[1] = pt[0]*A[0][1] + pt[1]*A[1][1] + pt[2]*A[2][1] + A[3][1];
  xformedpt[2] = pt[0]*A[0][2] + pt[1]*A[1][2] + pt[2]*A[2][2] + A[3][2];
  xformedpt[3] = pt[0]*A[0][3] + pt[1]*A[1][3] + pt[2]*A[2][3] + A[3][3];
}

/* quick way to invert translation and rotation matrix */
/* does not work with scaling, or ortho or perspective projections. */
/* for efficiency, result should  not = input A */
void
vt_reverse_transform(matrix4x4 A, matrix4x4 result)
{
    int i,j;
    matrix4x4 tmp;
    matrix4x4 *mp;

if (A == result)
      mp = (matrix4x4 *)tmp;
    else
      mp = (matrix4x4 *)result;

/* transpose rot */
    for (i=0;i<3;i++)
      for (j=0;j<3;j++) {
      (*mp)[i][j] = A[j][i];
      }
    /* negate and rotate trans */
    for (i=0;i<3;i++)
      (*mp)[3][i] = -A[3][0]*A[i][0]-A[3][1]*A[i][1]-A[3][2]*A[i][2];
```

APPENDIX I

```
    /* cp last column */
    for (i=0;i<4;i++)
       (*mp)[i][3] = A[i][3];

if (A==result) {         /* copy back to result */
      for (i=0;i<4;i++)
        for (j=0;j<4;j++)
          result[i][j] = (*mp)[i][j];
    }
} void
vt_matrix_to_euler_angles(matrix4x4 rotm, float *euler_angle)
{
  float sin_el,cos_el;

/* For a given matrix compute equivalent euler angles for az,el,roll */
  /* (i.e. z,y,x) rotation order. */
  /* NOTE 1: rotm must be purely a rotation/translation matrix there should */
  /* be no scaling and no perspective. */
  /* NOTE 2: we assume rotm is consistent with row vector notation not */
  /* column vector notation */

/* first row of rotm = [cos(el)*cos(az)   cos(el)*sin(az)  -sin(el) 0.0] */
  /* 3rd col. of rotm = [-sin(el)  sin(roll)*cos(el)  cos(roll)*cos(el) 0.0] */
  sin_el = (fabs(rotm[0][2]) > 1.0) ? -rotm[0][2]/fabs(rotm[0][2]) : -rotm[0][2];
  cos_el = sqrt(1.0 - sin_el*sin_el);

euler_angle[0] = atan2(sin_el,cos_el);
  euler_angle[1] = atan2(rotm[0][1],rotm[0][0]);
  euler_angle[2] = atan2(rotm[1][2],rotm[2][2]);
}

/* Finds the view transformation matrix to convert WCS points     */
/*     into observer C.S. points with flat z buffer.              */
void
vt_gen_view_matrix(pos3d camera_pos, vec3d gaze_vec, matrix4x4 view_matrix)
{
  matrix4x4 E, F, G, H;
  float alpha, beta, v;

vt_trans_matrix(camera_pos,F);
  alpha = vt_atan2(gaze_vec[VX], gaze_vec[VY]) - M_PI_2;
  vt_rot_matrix(alpha, 'z', G);
  v = vt_coord_plane_dist(gaze_vec, ZAXIS);  /* distance to x-y plane */
  beta = vt_atan2(v, gaze_vec[VZ]) + M_PI_2;

vt_rot_matrix(beta, 'x', H);
  vt_mult_matrix(G, F, E);
  vt_mult_matrix(H, E, view_matrix);
}
```

What is claimed is:

1. A device for measuring the position of a hand in space, said device comprising:
   a hand mount and a forearm mount;
   means for defining a site of reference;
   at least 3 links joined by revolute joints, each of said revolute joints comprising a goniometer; and
   one of said links positioned to parallel a forearm, connected to said hand mount proximal to one terminus and supported by said forearm mount.

2. A device according to claim 1, wherein said goniometers comprise Hall-Effect sensors.

3. A device according to claim 1, wherein said reference means is a block.

4. A device according to claim 1, wherein said reference means is attachment means for attachment to a surface.

5. A device according to claim 1, wherein said hand mount is a glove comprising a reinforced portion attached to a link.

6. A device for measuring the position of a hand in space, said device comprising:
   a hand mount for attachment to a hand;
   a forearm mount comprising a clip and a loop;
   a reference link for defining a site of reference;
   a linkage system comprising links joined by revolute joints, each of said revolute joints comprising a goniometer, comprising at one end said reference link and at the other end connection means for connection to said hand mount;
   one of said links positioned to parallel a forearm, extending through said loop and supported by said forearm mount.

7. A system for measuring the position of a physical hand and producing a graphical image of said hand on a monitor screen which follows the movements of the physical hand, said system comprising:
   a linkage system comprising:
   a hand mount and a forearm mount;
   means for defining a site of reference;
   at least 5 links joined by revolute joints, each of said revolute joints comprising a goniometer; and
   one of said links positioned to parallel a forearm, connected to said hand mount proximal to one terminus and supported by said forearm mount;
   electrical signal transmitting means connected to said goniometers for transmitting signals from said goniometers to a signal processing means for processing said signals and determining the position of said hand and sending a graphical signal to a monitor screen.

8. A system according to claim 7, comprising left and right linkage systems.

9. A system according to claim 7, wherein said forearm mount comprises forearm fastening means supporting a channel for receiving a link.

10. A system according to claim 7, wherein said goniometers comprise Hall-Effect sensors.

11. A Hall-Effect sensor assembly comprising:
    three links interconnected by two joints, said three links consisting of first and second terminal links and a middle link;
    said middle link housing two permanent magnets in fixed relationship; and
    Hall-Effect sensor elements in each of said first and second terminal links, each of said elements positioned in functional relationship to a corresponding permanent magnet.

12. A device according to claim 1, said device comprising 5 links joined by revolute joints, each of said revolute joints comprising a goniometer.

* * * * *